US009800719B1

(12) United States Patent
Botts

(10) Patent No.: US 9,800,719 B1
(45) Date of Patent: Oct. 24, 2017

(54) SYSTEMS AND METHODS FOR MANAGING POWER FOR A MOBILE DEVICE

(71) Applicant: Premergy, Inc., Macon, GA (US)

(72) Inventor: Richard Edward Botts, Griffin, GA (US)

(73) Assignee: PREMERGY, INC., Macon, GA (US)

( * ) Notice: Subject to any disclaimer, the term of this patent is extended or adjusted under 35 U.S.C. 154(b) by 0 days.

(21) Appl. No.: 15/646,610

(22) Filed: Jul. 11, 2017

(51) Int. Cl.
*H04M 1/73* (2006.01)
*H02J 7/00* (2006.01)
*H04M 1/02* (2006.01)

(52) U.S. Cl.
CPC ............ *H04M 1/73* (2013.01); *H02J 7/0021* (2013.01); *H02J 7/0024* (2013.01); *H04M 1/0262* (2013.01); *H02J 2007/0095* (2013.01); *H04M 2001/0204* (2013.01)

(58) Field of Classification Search
CPC .............. H04M 1/73; H04M 1/0262; H04M 2001/0204; H02J 7/0021; H02J 7/0024; H02J 2007/0095
USPC ...................................... 455/575.1
See application file for complete search history.

(56) References Cited

U.S. PATENT DOCUMENTS

| 3,855,534 | A | * | 12/1974 | Holcomb | ............. | H04B 1/3883 |
| | | | | | | 429/98 |
| 4,365,290 | A | * | 12/1982 | Nelms | .................... | A61N 1/365 |
| | | | | | | 365/227 |
| 4,531,083 | A | * | 7/1985 | Hoffman | .................... | G05F 3/22 |
| | | | | | | 320/128 |
| 4,540,929 | A | * | 9/1985 | Binkley | ................ | H02J 7/0054 |
| | | | | | | 320/104 |
| 4,649,332 | A | * | 3/1987 | Bell | ....................... | H02J 7/0024 |
| | | | | | | 320/117 |
| 4,881,258 | A | * | 11/1989 | Kaiwa | .................. | H04B 1/3877 |
| | | | | | | 379/440 |
| 5,121,046 | A | * | 6/1992 | McCullough | ......... | H02J 7/0024 |
| | | | | | | 307/71 |
| 5,336,894 | A | * | 8/1994 | Ellers | ...................... | F41G 7/004 |
| | | | | | | 250/504 R |

(Continued)

Primary Examiner — Hai V Nguyen
(74) Attorney, Agent, or Firm — Eversheds Sutherland (US) LLP

(57) ABSTRACT

Systems and methods are disclosed for managing power for a mobile device. In one embodiment, an example mobile device may include at least one memory, at least one processor, a first rechargeable battery, a second rechargeable battery, and one or more solid state relays. The at least one memory may store computer-executable instructions, and the at least one processor may be configured to access the at least one memory and execute the computer-executable instructions. The first rechargeable battery may be configured to power the at least one processor, and the second rechargeable battery may be configured to power the at least one processor. The one or more solid state relays may be electrically coupled to the first rechargeable battery and the second rechargeable battery and configured to transition between a first state in which the one or more solid state relays form a series connection between the first rechargeable battery and the second rechargeable battery and a second state in which the one or more solid state relays form a parallel connection between the first rechargeable battery and the second rechargeable battery.

26 Claims, 8 Drawing Sheets

(56) References Cited

U.S. PATENT DOCUMENTS

| | | | | |
|---|---|---|---|---|
| 5,369,351 A * | 11/1994 | Adams | A61N 1/378 | 320/121 |
| 5,552,692 A * | 9/1996 | McKillop | H02J 7/0054 | 320/137 |
| 5,668,712 A * | 9/1997 | Cassese | H03K 17/04123 | 363/95 |
| 5,773,959 A * | 6/1998 | Merritt | H01M 10/441 | 320/117 |
| 5,808,444 A * | 9/1998 | Saeki | H01M 10/425 | 320/117 |
| 5,922,981 A * | 7/1999 | Ballister | A63J 17/00 | 84/464 A |
| 6,093,982 A * | 7/2000 | Kroll | A61N 1/378 | 307/113 |
| 6,177,879 B1 * | 1/2001 | Kokubu | B60L 11/1801 | 340/432 |
| 6,351,097 B1 * | 2/2002 | Oh | H01M 10/441 | 320/107 |
| 6,498,957 B1 * | 12/2002 | Umetsu | G06F 1/26 | 320/117 |
| 6,522,902 B2 * | 2/2003 | Nishihara | H01M 10/4207 | 320/117 |
| 6,670,791 B1 * | 12/2003 | Smith | H01M 10/44 | 320/134 |
| 6,784,629 B2 * | 8/2004 | Choi | H02P 7/04 | 318/285 |
| 6,854,657 B2 * | 2/2005 | Johnson | G06K 19/0702 | 235/492 |
| 6,904,295 B2 * | 6/2005 | Yang | H04W 52/52 | 455/522 |
| 6,978,160 B2 * | 12/2005 | Hutchison | H04B 1/385 | 455/573 |
| 7,119,518 B1 * | 10/2006 | Dougherty | G01R 31/3631 | 320/117 |
| 7,149,554 B2 * | 12/2006 | Pinder | H04M 1/0262 | 455/343.1 |
| 7,176,656 B2 * | 2/2007 | Feldmann | B25F 5/00 | 320/112 |
| 7,579,810 B2 * | 8/2009 | Hsieh | H02J 7/0024 | 320/103 |
| 7,734,317 B2 * | 6/2010 | Patel | H02J 7/0013 | 320/129 |
| 7,808,205 B2 * | 10/2010 | Rao | H02J 7/0004 | 320/106 |
| 7,969,119 B2 * | 6/2011 | Odaohhara | H02J 7/0026 | 320/134 |
| 8,164,228 B1 * | 4/2012 | Botts | H02J 7/14 | 310/178 |
| 8,198,858 B2 * | 6/2012 | Kim | H02J 7/0047 | 320/106 |
| 8,238,127 B1 * | 8/2012 | Sadwick | H02M 5/293 | 363/126 |
| 8,305,725 B2 * | 11/2012 | Ooi | H01M 2/1066 | 361/103 |
| 8,373,388 B2 * | 2/2013 | Kim | H02J 7/025 | 307/104 |
| 8,396,609 B2 * | 3/2013 | Wang | H02J 7/0013 | 429/432 |
| 8,581,559 B2 * | 11/2013 | Botts | H02J 7/14 | 310/178 |
| 8,813,866 B2 * | 8/2014 | Suzuki | B25F 5/00 | 173/2 |
| 8,941,264 B2 * | 1/2015 | Scruggs | B60R 16/033 | 307/52 |
| 8,975,871 B2 * | 3/2015 | Hsu | H02J 1/14 | 320/103 |
| 9,063,200 B2 * | 6/2015 | Matsuura | G01R 31/3624 | |
| 9,073,440 B2 * | 7/2015 | Botts | H02J 7/14 | |
| 9,104,212 B2 * | 8/2015 | Wei | G05F 5/00 | |
| 9,137,025 B2 * | 9/2015 | Lambert | H04L 9/3263 | |
| 9,263,898 B1 * | 2/2016 | Ghazarian | H02J 7/0019 | |
| 9,293,928 B2 * | 3/2016 | Alexander | H02J 7/0013 | |
| 9,302,592 B2 * | 4/2016 | Lin | B60L 11/1822 | |
| 9,385,539 B2 * | 7/2016 | Zhamu | H02J 7/00 | |
| 9,553,463 B2 * | 1/2017 | Botts | H02J 7/0042 | |
| 9,564,891 B1 * | 2/2017 | Bixby | H03K 17/72 | |
| 9,577,516 B1 * | 2/2017 | Van Zyl | H02M 3/155 | |
| 9,592,744 B2 * | 3/2017 | Zhao | B60L 11/1861 | |
| 9,620,987 B2 * | 4/2017 | Alexander | H02J 7/025 | |
| 9,696,383 B2 * | 7/2017 | Kikuchi | G01R 31/3606 | |
| 2001/0012794 A1 * | 8/2001 | Nishihara | H01M 10/4207 | 455/574 |
| 2002/0048303 A1 * | 4/2002 | Strowitzki | H01S 3/0975 | 372/57 |
| 2003/0090158 A1 * | 5/2003 | Fauh | H02J 1/08 | 307/87 |
| 2004/0119341 A1 * | 6/2004 | Hickle | A61M 16/01 | 307/66 |
| 2004/0203988 A1 * | 10/2004 | Yang | H04W 52/52 | 455/522 |
| 2008/0007215 A1 * | 1/2008 | Hsieh | H02J 7/0024 | 320/114 |
| 2009/0009143 A1 * | 1/2009 | Odaohhara | H02J 7/045 | 320/162 |
| 2010/0010698 A1 * | 1/2010 | Iwashita | B60L 3/12 | 701/22 |
| 2010/0172287 A1 * | 7/2010 | Krieter | H04W 8/005 | 370/328 |
| 2012/0274335 A1 * | 11/2012 | Matsuura | G01R 31/3624 | 324/537 |
| 2012/0284514 A1 * | 11/2012 | Lambert | H04L 9/3263 | 713/168 |
| 2012/0286724 A1 * | 11/2012 | Tsai | H02J 7/025 | 320/108 |
| 2013/0093401 A1 * | 4/2013 | Botts | H02J 7/14 | 322/48 |
| 2013/0169038 A1 * | 7/2013 | King | B60L 3/0046 | 307/10.1 |
| 2013/0212409 A1 * | 8/2013 | Zhamu | G06F 1/263 | 713/300 |
| 2013/0234653 A1 * | 9/2013 | Botts | H02J 7/0042 | 320/107 |
| 2013/0234779 A1 * | 9/2013 | Klug, Jr. | H03K 17/04123 | 327/432 |
| 2014/0035529 A1 * | 2/2014 | Botts | H02J 7/14 | 320/109 |
| 2014/0265845 A1 * | 9/2014 | Williams | H05B 37/0245 | 315/86 |
| 2014/0265998 A1 * | 9/2014 | Nielson | H02J 7/0047 | 320/101 |
| 2014/0312848 A1 * | 10/2014 | Alexander | H02J 7/0013 | 320/134 |
| 2014/0354291 A1 * | 12/2014 | Kikuchi | H01M 10/441 | 324/434 |
| 2015/0054451 A1 * | 2/2015 | Rokusek | H02M 7/23 | 320/108 |
| 2015/0158392 A1 * | 6/2015 | Zhao | B60L 11/1861 | 320/109 |
| 2016/0012465 A1 * | 1/2016 | Sharp | G06Q 20/18 | 705/14.17 |
| 2016/0079788 A1 * | 3/2016 | Amasaki | H02J 7/0021 | 320/136 |
| 2016/0088132 A1 * | 3/2016 | Kranz | H04M 1/0262 | 340/573.1 |
| 2016/0089988 A1 * | 3/2016 | Bartz | B60L 11/182 | 320/108 |
| 2016/0118865 A1 * | 4/2016 | Botts | H02J 7/14 | 320/117 |
| 2016/0126781 A1 * | 5/2016 | Alexander | H02J 7/0013 | 320/108 |
| 2016/0219664 A1 * | 7/2016 | Ellenberger | H05B 33/0842 | |
| 2016/0226245 A1 * | 8/2016 | Ellenberger | H05B 33/0842 | |
| 2016/0226246 A1 * | 8/2016 | Ellenberger | H05B 33/0842 | |
| 2016/0268645 A1 * | 9/2016 | Koebler | H01M 2/1077 | |
| 2016/0378175 A1 * | 12/2016 | Wu | G06F 1/181 | 713/320 |
| 2016/0379768 A1 * | 12/2016 | Pham | G06F 1/30 | 307/142 |

(56) References Cited

U.S. PATENT DOCUMENTS

| | | | |
|---|---|---|---|
| 2017/0003326 A1* | 1/2017 | Lewis | G01R 19/2503 |
| 2017/0005492 A1* | 1/2017 | Kyllonen | H02J 7/0026 |
| 2017/0012446 A1* | 1/2017 | Lim | H02J 7/0027 |
| 2017/0136901 A1* | 5/2017 | Zhao | B60L 11/1822 |
| 2017/0163053 A1* | 6/2017 | Botts | H02J 7/0042 |
| 2017/0208159 A1* | 7/2017 | Romain | H04M 1/0262 |
| 2017/0243723 A1* | 8/2017 | Van Zyl | H01J 37/32146 |

* cited by examiner

SYSTEMS AND METHODS FOR MANAGING POWER FOR A MOBILE DEVICE

FIELD OF THE DISCLOSURE

The present disclosure relates generally to systems and methods for power management, and more particularly to systems and methods for managing power for a mobile device having multiple rechargeable batteries.

BACKGROUND OF THE DISCLOSURE

Mobile electronic devices, such as mobile phones, tablet computers, and the like, frequently may be used to run various types of software applications on the mobile device. In recent years, the development of certain processing-intensive applications for mobile devices has allowed users to perform tasks that traditionally have been performed by non-mobile electronic devices, such as desktop computers and the like. However, the use of such applications on a mobile device may require increased processing power and may rapidly reduce a charge level of a battery of the mobile device. As a result, the use of processing-intensive applications on a mobile device may require frequent charging of the battery or may be effectively limited to situations in which the mobile device is connected to an external power source.

In certain instances, mobile devices may be used in conjunction with one or more peripheral devices that are connected to and controlled by the mobile device. Example conventional peripheral devices may include headphones, game controllers, printers, and the like. When connected to a mobile device, such peripherals may be powered by the battery of the mobile device and provide additional functionality for the user. In this manner, the types of peripheral devices that may be used with a mobile device, and the added functions provided thereby, may be limited by the voltage of the battery. As a result, peripheral devices that require a voltage greater than that of the battery of a mobile device may not be capable of use with the mobile device.

A need therefore exists for improved systems and methods for managing power for mobile devices to provide increased processing power for running processing-intensive applications on a mobile device and/or to allow a mobile device to be used in conjunction with peripheral devices that traditionally cannot be powered by a mobile device.

Figure 1:
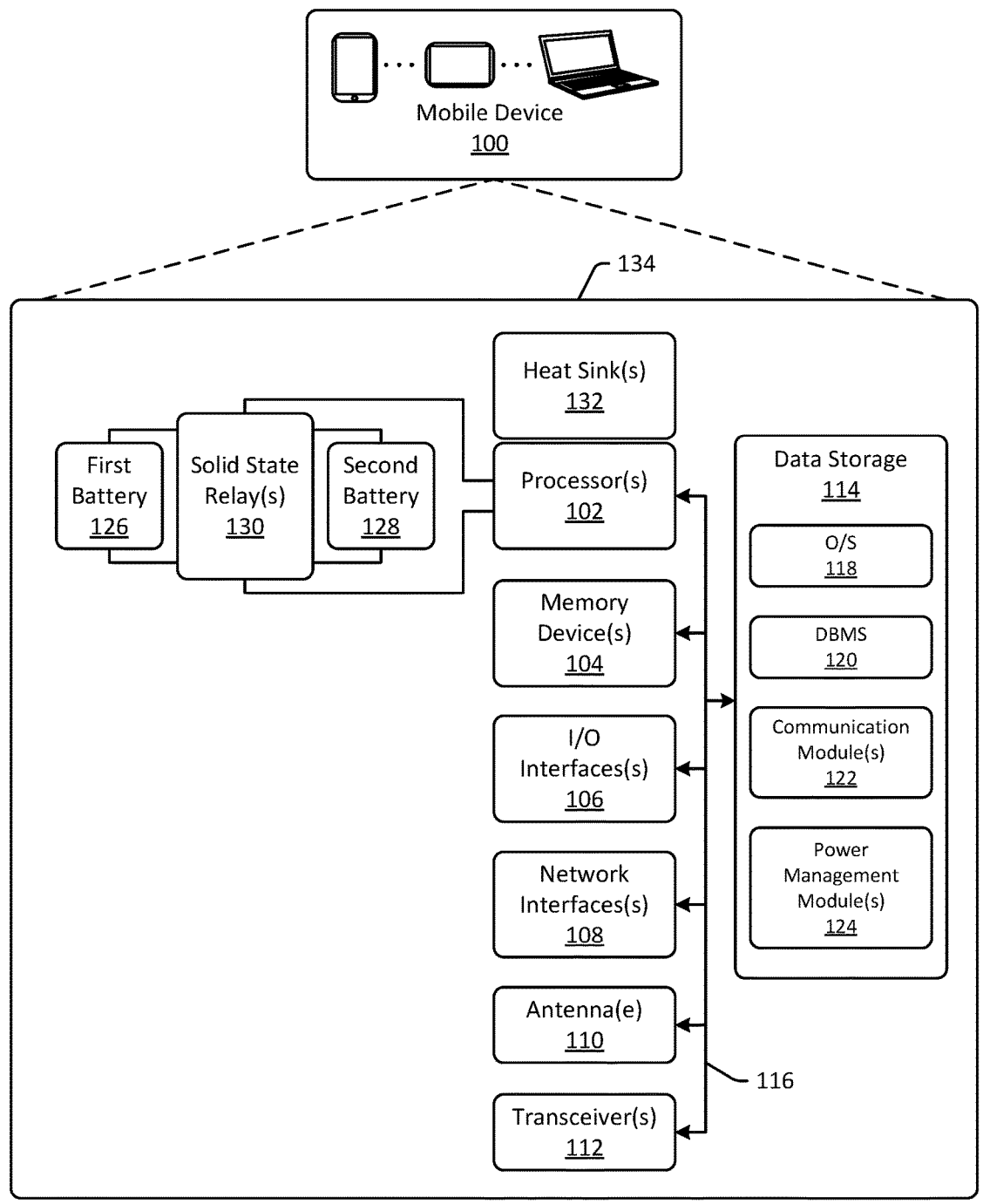
FIG. 1 schematically illustrates an example architecture of a system for managing power for a mobile device having multiple rechargeable batteries in accordance with one or more embodiments of the disclosure.

The detailed description is set forth with reference to the accompanying drawings. The drawings are provided for purposes of illustration only and merely depict example embodiments of the disclosure. The drawings are provided to facilitate understanding of the disclosure and shall not be deemed to limit the breadth, scope, or applicability of the disclosure. The use of the same reference numerals indicates similar, but not necessarily the same or identical components. Different reference numerals may be used to identify similar components. Various embodiments may utilize elements or components other than those illustrated in the drawings, and some elements and/or components may not be present in various embodiments. The use of singular terminology to describe a component or element may, depending on the context, encompass a plural number of such components or elements and vice versa.

DETAILED DESCRIPTION OF THE DISCLOSURE

Overview

Mobile electronic devices, such as mobile phones, tablet computers, and the like, may be used to run software applications on the mobile device, enabling users to perform various types of tasks. For example, basic applications commonly run on mobile devices may include calculator applications, calendar applications, mapping applications, weather applications, and the like. One or more processors of a mobile device may be capable of running such basic applications for an extended period of time while being powered by a rechargeable battery of the mobile device. When a charge level of the battery becomes low, a user may connect the mobile device to an external power source, such as a standard wall outlet, to charge the battery for further use of the device. The development of more processing-intensive applications for mobile devices has allowed users to perform tasks that traditionally have been performed by non-mobile electronic devices, such as desktop computers and the like. However, the use of such applications on a mobile device often may require increased processing power and may rapidly reduce a charge level of the battery when running for an extended period of time. Consequently, when using a processing-intensive application on a mobile device, a user generally must charge the battery on a frequent basis or maintain the mobile device connected to an external power source.

Users often may desire to connect one or more peripheral devices to a mobile device to provide additional functionality. For example, headphones often may be connected to a mobile device to allow a user to conveniently listen to audio content output by the device. When connected, a peripheral device may be controlled by the mobile device and powered by the battery of the mobile device. As a result, the types of peripheral devices that may be used with a mobile device, and the added functions provided thereby, may be limited by the voltage of the battery. Peripheral devices that require a relatively low voltage may be easily powered by the battery for an extended period of time, while peripheral devices that require a relatively high voltage may not be capable of use with a mobile device absent an additional power source to provide sufficient power thereto.

Embodiments of the disclosure may manage power for mobile devices to provide increased processing power for running processing-intensive applications on a mobile device. Certain embodiments may manage power based at least in part on a particular application to be run by one or more processors of a mobile device. In some embodiments, a mobile device, such as a mobile phone, may include at least one memory, at least one processor, a first rechargeable battery configured to power the at least one processor, a second rechargeable battery configured to power the at least one processor, and one or more solid state relays electrically coupled to the first rechargeable battery and the second rechargeable battery. The one or more solid state relays may be configured to transition between a first state in which the one or more solid state relays form a series connection between the first rechargeable battery and the second rechargeable battery and a second state in which the one or more solid state relays form a parallel connection between the first rechargeable battery and the second rechargeable battery. The at least one processor may cause the one or more solid state relays to form the series connection between the first rechargeable battery and the second rechargeable battery when running a processing-intensive application on the mobile device. The at least one processor may cause the one or more solid state relays to form the parallel connection between the first rechargeable battery and the second rechargeable battery when running a basic application on the mobile device. In this manner, the rechargeable batteries may provide increased voltage when connected in series to allow the at least one processor to run processing-intensive applications, and may provide increased capacity when connected in series. Further, the at least one processor may cause the one or more solid state relays to form the parallel connection between the first rechargeable battery and the second rechargeable battery when charging the batteries. In this manner, the amount of time required to charge the rechargeable batteries may be the same as that required to charge one of the batteries.

Some embodiments of the disclosure may determine a first voltage of the first rechargeable battery and a voltage required by the at least one processor to run a particular application. Some embodiments may compare the first voltage and the required voltage, and cause the first rechargeable battery and the second rechargeable battery to be connected in series or in parallel based at least in part on the comparison. For example, some embodiments may determine that the first voltage is less than the required voltage, cause the one or more solid state relays to form the series connection between the first rechargeable battery and the second rechargeable battery, and cause the first rechargeable battery and the second rechargeable battery to power the at least one processor while the first rechargeable battery and the second rechargeable battery are connected in series. In this manner, the at least one processor may receive sufficient power to run a processing-intensive application. Some embodiments may determine that the first voltage is greater than the required voltage, cause the one or more solid state relays to form the parallel connection between the first rechargeable battery and the second rechargeable battery, and cause the first rechargeable battery and the second rechargeable battery to power the at least one processor while the first rechargeable battery and the second rechargeable battery are connected in parallel. In this manner, increased battery capacity may be provided as the at least one processor runs a basic application.

Further, embodiments of the disclosure may manage power for mobile devices to allow a mobile device to be used in conjunction with peripheral devices that traditionally cannot be powered by a mobile device. Certain embodiments may manage power based at least in part on a particular peripheral device to be powered by the mobile device. Some embodiments of the disclosure may determine a first voltage of the first rechargeable battery and a voltage required by a particular peripheral device. Some embodiments may compare the first voltage and the required voltage, and cause the first rechargeable battery and the second rechargeable battery to be connected in series or in parallel based at least in part on the comparison. For example, some embodiments may determine that the first voltage is less than the required voltage, cause the one or more solid state relays to form the series connection between the first rechargeable battery and the second rechargeable battery, and cause the first rechargeable battery and the second rechargeable battery to power the peripheral device while the first rechargeable battery and the second rechargeable battery are connected in series. In this manner, the high-power peripheral device may be powered by and used in conjunction with the mobile device. Some embodiments may determine that the first voltage is greater than the required voltage, cause the one or more solid state relays to form the parallel connection between the first rechargeable battery and the second rechargeable battery, and cause the first rechargeable battery and the second rechargeable battery to power the peripheral device while the first rechargeable battery and the second rechargeable battery are connected in parallel. In this manner, increased battery capacity may be provided as the rechargeable batteries power the low-power peripheral device.

As a result, embodiments of the disclosure may expand the processing capabilities of a mobile device while efficiently managing power provided by multiple rechargeable batteries of the mobile device. In particular, as compared to existing technology, systems and methods provided herein may allow a user to run a processing-intensive application on a mobile device for a longer period of time before charging the batteries thereof, and may allow the batteries to be subsequently charged in a comparable period of time. Further, embodiments of the disclosure may expand a range of peripheral devices that may be used with and powered by a mobile device. In particular, systems and methods provided herein may allow a mobile device to power a peripheral device that is not capable of being powered by existing mobile devices. In this manner, embodiments of the disclosure may address certain limitations presented by conventional systems and methods for managing power for mobile devices and meet the increasing needs of users in performing certain complex tasks with mobile devices as well as adding further functionality thereto via high-power peripheral devices.

This disclosure relates to, among other things, systems, methods, computer-readable media, techniques, and methodologies for managing power for a mobile device, which may include multiple rechargeable batteries. Embodiments may determine a first voltage of a first rechargeable battery of a mobile device and a voltage required by at least one processor of the mobile device to run a particular application, and based at least in part on the first voltage and the required voltage, may cause one or more solid state relays to form a series connection or a parallel connection between the first rechargeable battery and a second rechargeable battery of the mobile device. Embodiments may determine a first voltage of a first rechargeable battery of a mobile device and a voltage required by to power a peripheral device connected to the mobile device, and based at least in part on the first voltage and the required voltage, may cause one or more solid state relays to form a series connection or a parallel connection between the first rechargeable battery and a second rechargeable battery of the mobile device.

Referring now to FIG. 1, an example mobile device 100 in accordance with one or more embodiments of the disclosure is depicted. The mobile device 100 may be any suitable type of mobile electronic device, such as a mobile phone, a tablet computer, a laptop computer, and the like. The mobile device 100 may be configured to communicate via one or more networks with one or more servers, other mobile devices, non-mobile devices, or the like. Further, the mobile device 100 may be configured to cooperate with and power one or more peripheral devices. As described below, the mobile device 100 may be configured to manage power provided by multiple rechargeable batteries of the mobile device 100 by selectively changing a connection between the rechargeable batteries based at least in part on a particular application to be run on the mobile device 100, a particular peripheral device connected to the mobile device 100, and/or a charging state of the mobile device 100.

The mobile device 100 may be configured to communicate via one or more networks. Such networks may include, but are not limited to, any one or more different types of communications networks such as, for example, cable networks, public networks (e.g., the Internet), private networks (e.g., frame-relay networks), wireless networks, cellular networks, telephone networks (e.g., a public switched telephone network), or any other suitable private or public packet-switched or circuit-switched networks. Further, such networks 540 may have any suitable communication range associated therewith and may include, for example, global networks (e.g., the Internet), metropolitan area networks (MANs), wide area networks (WANs), local area networks (LANs), or personal area networks (PANs). In addition, such networks may include communication links and associated networking devices (e.g., link-layer switches, routers, etc.) for transmitting network traffic over any suitable type of medium including, but not limited to, coaxial cable, twisted-pair wire (e.g., twisted-pair copper wire), optical fiber, a hybrid fiber-coaxial (HFC) medium, a microwave medium, a radio frequency communication medium, a satellite communication medium, or any combination thereof.

In an illustrative configuration, the mobile device 100 may include one or more processors (processor(s)) 102, one or more memory devices 104 (also referred to herein as memory 104), one or more input/output (I/O) interface(s) 106, one or more network interface(s) 108, one or more antenna(e) 110, one or more transceiver(s) 112, and data storage 114. The mobile device 100 may further include one or more bus(es) 116 that functionally couple various components of the mobile device 100. These various components will be described in more detail hereinafter.

The bus(es) 1516 may include at least one of a system bus, a memory bus, an address bus, or a message bus, and may permit the exchange of information (e.g., data (including computer-executable code), signaling, etc.) between various components of the mobile device 100. The bus(es) 116 may include, without limitation, a memory bus or a memory controller, a peripheral bus, an accelerated graphics port, and so forth. The bus(es) 116 may be associated with any suitable bus architecture including, without limitation, an Industry Standard Architecture (ISA), a Micro Channel Architecture (MCA), an Enhanced ISA (EISA), a Video Electronics Standards Association (VESA) architecture, an Accelerated Graphics Port (AGP) architecture, a Peripheral Component Interconnects (PCI) architecture, a PCI-Express architecture, a Personal Computer Memory Card International Association (PCMCIA) architecture, a Universal Serial Bus (USB) architecture, and so forth.

The memory 104 of the mobile device 100 may include volatile memory (memory that maintains its state when supplied with power) such as random access memory (RAM) and/or non-volatile memory (memory that maintains its state even when not supplied with power) such as read-only memory (ROM), flash memory, ferroelectric RAM (FRAM), and so forth. Persistent data storage, as that term is used herein, may include non-volatile memory. In certain example embodiments, volatile memory may enable faster read/write access than non-volatile memory. However, in certain other example embodiments, certain types of non-volatile memory (e.g., FRAM) may enable faster read/write access than certain types of volatile memory.

In various implementations, the memory 104 may include multiple different types of memory such as various types of static random access memory (SRAM), various types of dynamic random access memory (DRAM), various types of unalterable ROM, and/or writeable variants of ROM such as electrically erasable programmable read-only memory (EEPROM), flash memory, and so forth. The memory 104 may include main memory as well as various forms of cache memory such as instruction cache(s), data cache(s), translation lookaside buffer(s) (TLBs), and so forth. Further, cache memory such as a data cache may be a multi-level cache organized as a hierarchy of one or more cache levels (L1, L2, etc.).

The data storage 114 may include removable storage and/or non-removable storage including, but not limited to, magnetic storage, optical disk storage, and/or tape storage. The data storage 114 may provide non-volatile storage of computer-executable instructions and other data. The memory 104 and the data storage 114, removable and/or non-removable, are examples of computer-readable storage media (CRSM) as that term is used herein.

The data storage 114 may store computer-executable code, instructions, or the like that may be loadable into the memory 104 and executable by the processor(s) 102 to cause the processor(s) 102 to perform or initiate various operations described herein. The data storage 114 may additionally store data that may be copied to the memory 104 for use by the processor(s) 102 during the execution of the computer-executable instructions. Moreover, output data generated as a result of execution of the computer-executable instructions by the processor(s) 102 may be stored initially in the memory 104, and may ultimately be copied to data storage 114 for non-volatile storage.

More specifically, the data storage 114 may store one or more operating systems (O/S) 118; one or more database management systems (DBMS) 120; and one or more program module(s), applications, engines, computer-executable code, scripts, or the like such as, for example, one or more communication module(s) 122 and/or one or more power management module(s) 124. Some or all of these module(s) may be or include sub-module(s). Any of the components depicted as being stored in data storage 114 may include any combination of software, firmware, and/or hardware. The software and/or firmware may include computer-executable code, instructions, or the like that may be loaded into the memory 104 for execution by one or more of the processor(s) 102. Any of the components depicted as being stored in data storage 114 may support the functionality described in reference to the corresponding components named in this disclosure.

The data storage 114 may further store various types of data utilized by the components of the mobile device 100. Any data stored in the data storage 114 may be loaded into the memory 104 for use by the processor(s) 102 in executing computer-executable code. In addition, any data depicted as being stored in the data storage 114 may potentially be stored in one or more datastore(s) and may be accessed via the DBMS 120 and loaded in the memory 104 for use by the processor(s) 102 in executing computer-executable code. The datastore(s) may include, but are not limited to, databases (e.g., relational, object-oriented, etc.), file systems, flat files, distributed datastores in which data is stored on more than one node of a computer network, peer-to-peer network datastores, or the like.

The processor(s) 102 may be configured to access the memory 104 and execute computer-executable instructions loaded therein. For example, the processor(s) 102 may be configured to execute computer-executable instructions of the various program module(s), applications, engines, or the like of the mobile device 100 to cause or facilitate various operations to be performed in accordance with one or more embodiments of the disclosure. The processor(s) 102 may include any suitable processing unit capable of accepting data as input, processing the input data in accordance with stored computer-executable instructions, and generating output data. The processor(s) 102 may include any type of suitable processing unit including, but not limited to, a central processing unit, a microprocessor, a Reduced Instruction Set Computer (RISC) microprocessor, a Complex Instruction Set Computer (CISC) microprocessor, a microcontroller, an Application Specific Integrated Circuit (ASIC), a Field-Programmable Gate Array (FPGA), a System-on-a-Chip (SoC), a digital signal processor (DSP), and so forth. Further, the processor(s) 102 may have any suitable microarchitecture design that includes any number of constituent components such as, for example, registers, multiplexers, arithmetic logic units, cache controllers for controlling read/write operations to cache memory, branch predictors, or the like. The microarchitecture design of the processor(s) 102 may be capable of supporting any of a variety of instruction sets.

Referring now to functionality supported by the various program module(s) depicted in FIG. 1, the communication module(s) 122 may include computer-executable instructions, code, or the like that responsive to execution by one or more of the processor(s) 102 may perform functions including, but not limited to, communicating with remote servers, communicating with remote datastores, communicating with other electronic devices, sending or receiving information and instructions, and the like.

The power management module(s) 124 may include computer-executable instructions, code, or the like that responsive to execution by one or more of the processor(s) 102 may perform functions including, but not limited to, determining a voltage of a rechargeable battery of the mobile device 100, receiving a user request to run an application on the mobile device 100, determining a voltage required by the processor(s) 102 to run a particular application, comparing a voltage of a rechargeable battery of the mobile device 100 and a required voltage of the processor(s) 102 to run a particular application, causing one or more solid state relays of the mobile device 100 to form a series connection or a parallel connection between a first rechargeable battery and a second rechargeable battery of the mobile device 100, causing a first rechargeable battery and a second rechargeable battery of the mobile device 100 to power the processor(s) 102, determining that the mobile device 100 is connected to an external power source, causing a first rechargeable battery and a second rechargeable battery of the mobile device 100 to be charged by an external power source, determining that a peripheral device is connected to the mobile device 100, comparing a voltage of a rechargeable battery of the mobile device 100 and a required voltage of a particular peripheral device connected to the mobile device 100, and the like.

Referring now to other illustrative components depicted as being stored in the data storage 114, the 0/S 118 may be loaded from the data storage 114 into the memory 104 and may provide an interface between other application software executing on the mobile device 100 and the hardware resources of the mobile device 100. More specifically, the 0/S 118 may include a set of computer-executable instructions for managing the hardware resources of the mobile device 100 and for providing common services to other application programs (e.g., managing memory allocation among various application programs). In certain example embodiments, the 0/S 118 may control execution of the other program module(s) to dynamically enhance characters for content rendering. The O/S 118 may include any operating system now known or which may be developed in the future including, but not limited to, any server operating system, any mainframe operating system, or any other proprietary or non-proprietary operating system.

The DBMS 120 may be loaded into the memory 104 and may support functionality for accessing, retrieving, storing, and/or manipulating data stored in the memory 104 and/or data stored in the data storage 114. The DBMS 120 may use any of a variety of database models (e.g., relational model, object model, etc.) and may support any of a variety of query languages. The DBMS 120 may access data represented in one or more data schemas and stored in any suitable data repository including, but not limited to, databases (e.g., relational, object-oriented, etc.), file systems, flat files, distributed datastores in which data is stored on more than one node of a computer network, peer-to-peer network datastores, or the like. The DBMS 120 may be any suitable light-weight DBMS optimized for performance on a mobile device.

Referring now to other illustrative components of the mobile device 100, the input/output (I/O) interface(s) 106 may facilitate the receipt of input information by the mobile device 100 from one or more I/O devices as well as the output of information from the mobile device 100 to the one or more I/O devices. The I/O devices may include any of a variety of components such as a display or display screen having a touch surface or touchscreen; an audio output device for producing sound, such as a speaker; an audio capture device, such as a microphone; an image and/or video capture device, such as a camera; a haptic unit; and so forth. Any of these components may be integrated into the mobile device 100 or may be separate.

The I/O interface(s) 106 may also include an interface for an external peripheral device connection such as universal serial bus (USB), FireWire, Thunderbolt, Ethernet port or other connection protocol that may connect to one or more networks. The I/O interface(s) 106 may also include a connection to one or more of the antenna(e) 110 to connect to one or more networks via a wireless local area network (WLAN) (such as Wi-Fi) radio, Bluetooth, and/or a wireless network radio, such as a radio capable of communication with a wireless communication network such as a Long Term Evolution (LTE) network, a WiMAX network, a 3G network, etc.

The mobile device 100 may further include one or more network interface(s) 108 via which the mobile device 100 may communicate with any of a variety of other systems, platforms, networks, devices, and so forth. The network interface(s) 108 may enable communication, for example, with one or more wireless routers, one or more host servers, one or more web servers, and the like via one or more networks.

The antenna(e) 110 may include, without limitation, a cellular antenna for transmitting or receiving signals to/from a cellular network infrastructure, an antenna for transmitting or receiving Wi-Fi signals to/from an access point (AP), a Global Navigation Satellite System (GNSS) antenna for receiving GNSS signals from a GNSS satellite, a Bluetooth antenna for transmitting or receiving Bluetooth signals, a Near Field Communication (NFC) antenna for transmitting or receiving NFC signals, and so forth. The antenna(e) 110 may include any suitable type of antenna depending, for example, on the communications protocols used to transmit or receive signals via the antenna(e) 110. Non-limiting examples of suitable antennae may include directional antennae, non-directional antennae, dipole antennae, folded dipole antennae, patch antennae, multiple-input multiple-output (MIMO) antennae, or the like. The antenna(e) 110 may be communicatively coupled to one or more transceivers 112 or radio components to which or from which signals may be transmitted or received.

The antenna(e) 110 may include a cellular antenna configured to transmit or receive signals in accordance with established standards and protocols, such as Global System for Mobile Communications (GSM), 3G standards (e.g., Universal Mobile Telecommunications System (UMTS), Wideband Code Division Multiple Access (W-CDMA), CDMA2000, etc.), 4G standards (e.g., Long-Term Evolution (LTE), WiMax, etc.), direct satellite communications, or the like.

The antenna(e) 110 may additionally, or alternatively, include a GNSS antenna configured to receive GNSS signals from three or more GNSS satellites carrying time-position information to triangulate a position therefrom. Such a GNSS antenna may be configured to receive GNSS signals from any current or planned GNSS such as, for example, the Global Positioning System (GPS), the GLONASS System, the Compass Navigation System, the Galileo System, or the Indian Regional Navigational System.

The transceiver(s) 112 may include any suitable radio component(s) for—in cooperation with the antenna(e) 110—transmitting or receiving radio frequency (RF) signals in the bandwidth and/or channels corresponding to the communications protocols utilized by the mobile device 100 to communicate with other devices. The transceiver(s) 112 may include hardware, software, and/or firmware for modulating, transmitting, or receiving—potentially in cooperation with any of antenna(e) 110—communications signals according to any of the communications protocols discussed above including, but not limited to, one or more Wi-Fi and/or Wi-Fi direct protocols, as standardized by the IEEE 1002.11 standards, one or more non-Wi-Fi protocols, or one or more cellular communications protocols or standards. The transceiver(s) 112 may further include hardware, firmware, or software for receiving GNSS signals. The transceiver(s) 112 may include any known receiver and baseband suitable for communicating via the communications protocols utilized by the mobile device 100. The transceiver(s) 112 may further include a low noise amplifier (LNA), additional signal amplifiers, an analog-to-digital (A/D) converter, one or more buffers, a digital baseband, or the like.

It should be appreciated that the program module(s), applications, computer-executable instructions, code, or the like depicted in FIG. 1 as being stored in the data storage 114 are merely illustrative and not exhaustive and that the processing described as being supported by any particular module may alternatively be distributed across multiple module(s) or performed by a different module. In addition, various program module(s), script(s), plug-in(s), Application Programming Interface(s) (API(s)), or any other suitable computer-executable code hosted locally on the mobile device 100, and/or hosted on other computing device(s) accessible via one or more networks, may be provided to support the functionality provided by the program module(s), applications, or computer-executable code depicted in FIG. 1 and/or additional or alternate functionality. Further, functionality may be modularized differently such that processing described as being supported collectively by the collection of program module(s) depicted in FIG. 1 may be performed by a fewer or greater number of module(s), or functionality described as being supported by any particular module may be supported, at least in part, by another module. In addition, program module(s) that support the functionality described herein may form part of one or more applications executable across any number of systems or devices in accordance with any suitable computing model such as, for example, a client-server model, a peer-to-peer model, and so forth. In addition, any of the functionality described as being supported by any of the program module(s) depicted in FIG. 1 may be implemented, at least partially, in hardware and/or firmware.

It should further be appreciated that the mobile device 100 may include alternate and/or additional hardware, software, or firmware components beyond those described or depicted without departing from the scope of the disclosure. More particularly, it should be appreciated that software, firmware, or hardware components depicted as forming part of the mobile device 100 are merely illustrative and that some components may not be present or additional components may be provided in various embodiments. While various illustrative program module(s) have been depicted and described as software module(s) stored in the data storage 114, it should be appreciated that the functionality described as being supported by the program module(s) may be enabled by any combination of hardware, software, and/or firmware. It should further be appreciated that each of the above-mentioned module(s) may, in various embodiments, represent a logical partitioning of supported functionality. This logical partitioning is depicted for ease of explanation of the functionality and may not be representative of the structure of software, hardware, and/or firmware for implementing the functionality. Accordingly, it should be appreciated that functionality described as being provided by a particular module may, in various embodiments, be provided at least in part by one or more other module(s). Further, one or more depicted module(s) may not be present in certain embodiments, while in other embodiments, additional module(s) not depicted may be present and may support at least a portion of the described functionality and/or additional functionality. Moreover, while certain module(s) may be depicted and described as sub-module(s) of another module, in certain embodiments, such module(s) may be provided as independent module(s) or as sub-module(s) of other module(s).

Referring to FIG. 1, the mobile device 100 also may include multiple rechargeable batteries electrically connected to one another and configured to power the processor(s) 102. According to the illustrated embodiment, the mobile device 100 may include a first rechargeable battery 126 and a second rechargeable battery 128 each configured to power the processor(s) 102. In some embodiments, the rechargeable batteries 126, 128 may be lithium-ion (Li-ion) batteries. In other embodiments, the rechargeable batteries 126, 128 may be lithium-ion polymer (Li-ion polymer) batteries, nickel metal hydride (NiMH) batteries, nickel cadmium (NiCd) batteries, or the like. The first rechargeable battery 126 and the second rechargeable battery 128 may have an identical configuration, with the same nominal voltage and the same capacity. In some embodiments, the rechargeable batteries 126, 128 each may have a nominal voltage of 3.7V. In other embodiments, the batteries 126, 128 each may have a nominal voltage of 1.8V. Still other nominal voltages of the batteries 126, 128 may be used. Although the illustrated embodiment is shown as including two rechargeable batteries 126, 128, the mobile device 100 may include any number of rechargeable batteries electrically connected to one another and configured to power the processor(s) 102. In various embodiments, the mobile device 100 may include three, four, five, six, seven, eight, nine, ten, or more rechargeable batteries each having an identical configuration, with the same nominal voltage and the same capacity.

The mobile device 100 further may include one or more solid state relay(s) 130 electrically coupled to the multiple rechargeable batteries of the mobile device 100. According to the illustrated embodiment, the one or more solid state relay(s) 130 may be electrically coupled to the first rechargeable battery 126 and the second rechargeable battery 128 and configured to control an electrical connection formed between the first rechargeable battery 126 and the second rechargeable battery 128. In particular, the one or more solid state relay(s) 130 may be configured to transition between a first state in which the one or more solid state relay(s) 130 form a series connection between the first rechargeable battery 126 and the second rechargeable battery 128, and a second state in which the one or more solid state relay(s) 130 form a parallel connection between the first rechargeable battery 126 and the second rechargeable battery 128. In this manner, the one or more solid state relay(s) 130 may facilitate power management of the rechargeable batteries 126, 128 during discharging and charging of the rechargeable batteries 126, 128, as described below. In some embodiments, the one or more solid state relay(s) 130 may include one or more metal-oxide-semiconductor field-effect transistor(s) (MOSFET(s)). In some embodiments, the one or more solid state relay(s) 130 may include one or more enhancement-mode MOSFETs. Other types of solid state relay(s) may be used. The mobile device 100 may include any number of solid state relay(s) 130 configured to selectively form a series connection between the rechargeable batteries 126, 128 and a parallel connection between the rechargeable batteries 128.

In the example of FIG. 1, the mobile device 100 may include a heat sink 132 configured to dissipate heat generated during operation of the mobile device 100. In some embodiments, the heat sink 132 may be positioned adjacent to the one or more processor(s) 102 and configured to dissipate heat generated by the processor(s) 102. For example, heat generated by the one or more processor(s) 102 may increase when the first rechargeable battery 126 and the second rechargeable battery 128 and connected in series and provide increased processing power to the processor(s) 102, and the heat sink 132 may facilitate dissipation of such heat. In some embodiments, the heat sink 132 additionally of alternatively may be positioned adjacent to the first rechargeable battery 126 and the second rechargeable battery 128 and configured to dissipate heat generated thereby. In some embodiments, the heat sink 132 may include an array of fins extending away from the processor(s) 102 and/or the rechargeable batteries 126, 128. In some embodiments, the heat sink 132 may be formed of copper, aluminum, or other suitable metal.

The mobile device 100 also may include a housing 134 enclosing one or more components of the device 100 therein. In some embodiments, the first rechargeable battery 126 and the second rechargeable battery 128 may be enclosed within the housing 134. In some embodiments, the processor(s) 102, the memory 104, the first rechargeable battery 126, the second rechargeable battery 128, the solid state relay(s) 130, and the heat sink 132 may be enclosed within the housing 134. The housing 134 may be an integral component of the mobile device 100, as distinguished from a removable case configured to removably attach to and protect the mobile device 100. In various embodiments, the housing 134 may be formed of one or more plastics, metals, composites, and/or glass.

One or more illustrative embodiments of the disclosure have been described above. The above-described embodiments are merely illustrative of the scope of this disclosure and are not intended to be limiting in any way. Accordingly, variations, modifications, and equivalents of embodiments disclosed herein are also within the scope of this disclosure. The above-described embodiments and additional and/or alternative embodiments of the disclosure will be described in detail hereinafter through reference to the accompanying drawings.

Illustrative Processes and Use Cases

Figure 2:
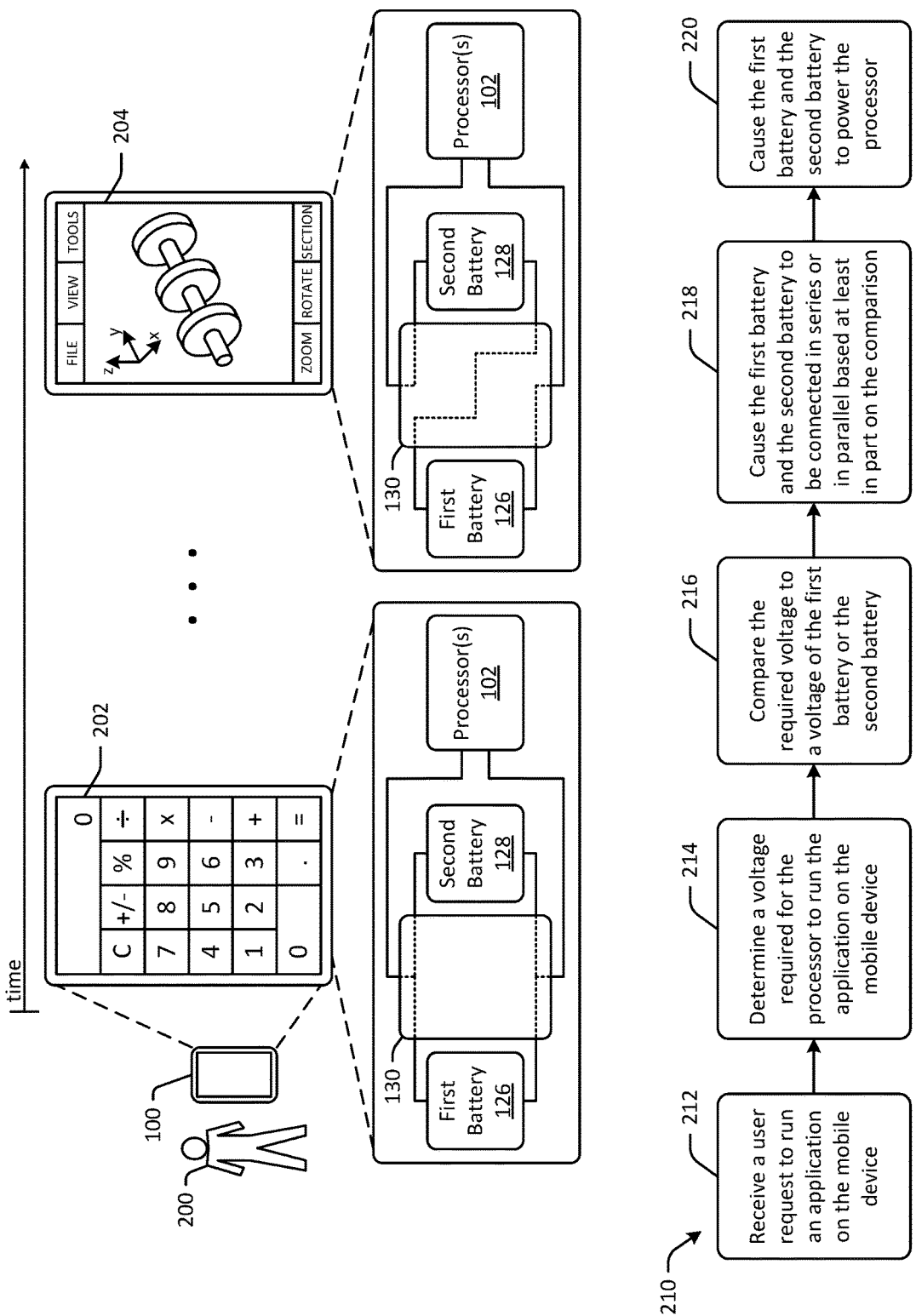
FIG. 2 is a hybrid system and process diagram illustrating managing power for a mobile device having multiple rechargeable batteries in accordance with one or more embodiments of the disclosure.

Referring to FIG. 2, a hybrid system and process diagram illustrating managing power for a mobile device having multiple rechargeable batteries in accordance with one or more embodiments of the disclosure is depicted. As explained above, the mobile device 100 may be configured to manage power provided by the rechargeable batteries of the mobile device 100 by selectively changing a connection between the rechargeable batteries based at least in part on a particular application to be run on the mobile device 100. In the example of FIG. 2, a user 200 may interact with the mobile device 100 to use a first software application. For example, the user 200 may select one or more selectable elements displayed at a user interface of the mobile device 100, which may cause a user request for the first application to be sent to the processor(s) 102. Upon receiving the user request to run the first application on the mobile device 100, the processor(s) 102 may determine a first required voltage that is required for the processor(s) 102 to run the first application. In some embodiments, data relating to respective required voltages to run applications available on the mobile device 100 may be stored at the data storage 114, for example at the power management module(s) 124, and accessible to the processor(s) 102. The processor(s) 102 also may determine a first voltage of the first rechargeable battery 126 and/or a second voltage of the second rechargeable battery 128. It will be appreciated that the configuration of the first rechargeable battery 126 and the second rechargeable battery 128 may cause the batteries 126, 128 to discharge at the same rate and to be charged at the same rate.

Accordingly, the processor(s) 102 may determine only the first voltage of the first rechargeable battery 126 or the second voltage of the second rechargeable battery 128. The processor(s) 102 may compare the first voltage of the first rechargeable battery 126 and the first required voltage for running the first application. In some instances, the processor(s) 102 may determine that the first voltage of the first rechargeable battery 126 is greater than the first required voltage for running the first application. In the example of FIG. 2, the first application may be a basic application, such as a calculator application, and the first required voltage may be less than the first voltage of the first rechargeable battery 126 (and less than the second voltage of the second rechargeable battery 128). As a result, the processor(s) 102 may cause the solid state relay(s) 130 to form a parallel connection between the first rechargeable battery 126 and the second rechargeable battery 128 (it will be appreciated that the parallel connection shown by dashed lines is for illustration purposes only and does not reflect the configuration of the solid state relay(s) 130). The processor(s) 102 may run the first application and cause content relating to the first application to be presented at a first user interface 202, and the first rechargeable battery 126 and the second rechargeable battery 128 may power the processor(s) 102 while the batteries 126, 128 are connected in parallel. The user 200 may interact with the content presented at the first user interface 202 and use the first application. The parallel connection between the first rechargeable battery 126 and the second rechargeable battery 128 may be maintained while the processor(s) 102 continues to run the first application on the mobile device 100.

In the example of FIG. 2, the user 200 subsequently may interact with the mobile device 100 to use a second software application. For example, the user 200 may select one or more selectable elements displayed at a user interface of the mobile device 100, which may cause a user request for the second application to be sent to the processor(s) 102. Upon receiving the user request to run the second application on the mobile device 100, the processor(s) 102 may determine a second required voltage that is required for the processor(s) 102 to run the second application. The processor(s) 102 also may determine a first voltage of the first rechargeable battery 126 and/or a second voltage of the second rechargeable battery 128. The processor(s) 102 may compare the first voltage of the first rechargeable battery 126 and the second required voltage for running the second application. In some instances, the processor(s) 102 may determine that the first voltage of the first rechargeable battery 126 is less than the second required voltage for running the second application. In the example of FIG. 2, the second application may be a processing-intensive application, such as a computer-aided design (CAD) application, and the second required voltage may be greater than the first voltage of the first rechargeable battery 126 (and greater than the second voltage of the second rechargeable battery 128). As a result, the processor(s) 102 may cause the solid state relay(s) 130 to form a series connection between the first rechargeable battery 126 and the second rechargeable battery 128 (it will be appreciated that the series connection shown by dashed lines is for illustration purposes only and does not reflect the configuration of the solid state relay(s) 130). The processor(s) 102 may run the second application and cause content relating to the second application to be presented at a second user interface 204, and the first rechargeable battery 126 and the second rechargeable battery 128 may power the processor(s) 102 while the batteries 126, 128 are connected in series. The user 200 may interact with the content presented at the second user interface 204 and use the second application. The series connection between the first rechargeable battery 126 and the second rechargeable battery 128 may be maintained while the processor(s) 102 continue to run the second application on the mobile device 100.

To manage the power provided by the rechargeable batteries 126, 128 of the mobile device 100 based at least in part on a particular application to be run on the mobile device 100, the one or more processor(s) 102 may execute one or more process flows. For example, an example process flow 210 for managing the power provided by the rechargeable batteries 126, 128 of the mobile device 100 is depicted in FIG. 2. Although certain operations are illustrated as occurring separately in FIG. 2, some or all of the operations may occur concurrently or partially concurrently. In some embodiments, the operations of the process flow 210 may be executed by one or more processor(s), such as the processor(s) 102 of the mobile device 100.

At block 212 of the process flow 210, the processor(s) 102 may receive a user request to run an application on the mobile device 100. For example, a user may interact with the mobile device 100 by selecting content indicating the user's intent to open the application, which may cause a user request for the application to be sent to the processor(s) 102.

At block 214 of the process flow 210, the processor(s) 102 may determine a voltage required for the processor(s) 102 to run the application on the mobile device 100. In some instances, data relating to the required voltage for running the application on the mobile device 100 may be stored at the power management module 124 of the data storage 114 and may be retrieved by the processor(s) 102.

At block 216 of the process flow 210, the processor(s) 102 may compare the required voltage for running the application on the mobile device 100 and a voltage of the first rechargeable battery 126 or the second rechargeable battery 128. For example, the processor(s) 102 may determine the voltage of the first rechargeable battery 126 or the voltage of the second rechargeable battery 128 and compare such voltage to the required voltage for running the application. In some instances, the voltage of the first rechargeable battery 126 (and the voltage of the second rechargeable battery 128) may be less than the required voltage for running the application. In some instances, voltage of the first rechargeable battery 126 (and the voltage of the second rechargeable battery 128) may be greater than the required voltage for running the application.

At block 218 of the process flow 210, the processor(s) 102 may cause the first rechargeable battery 126 and the second rechargeable battery 128 to be connected in series or in parallel based at least in part on the comparison of the required voltage for running the application on the mobile device 100 and the voltage of the first rechargeable battery 126 or the second rechargeable battery 128. In instances in which the voltage of the first rechargeable battery 126 (and the voltage of the second rechargeable battery 128) is less than the required voltage for running the application, the processor(s) 102 may cause the first rechargeable battery 126 and the second rechargeable battery 128 to be connected in series. The processor(s) 102 may cause the one or more solid state relay(s) 130 to form the series connection between the first rechargeable battery 126 and the second rechargeable battery 128. In instances in which the voltage of the first rechargeable battery 126 (and the voltage of the second rechargeable battery 128) is greater than the required voltage for running the application, the processor(s) 102 may cause the first rechargeable battery 126 and the second rechargeable battery 128 to be connected in parallel. The processor(s) 102 may cause the one or more solid state relay(s) 130 to form the parallel connection between the first rechargeable battery 126 and the second rechargeable battery 128.

At block 220 of the process flow 210, the processor(s) 102 may cause the first rechargeable battery 126 and the second rechargeable battery 128 to power the processor(s) 102 for running the application. In some instances, the processor(s) 102 may cause the first rechargeable battery 126 and the second rechargeable battery 128 to power the processor(s) 102 while the first rechargeable battery 126 and the second rechargeable battery 128 are connected in series. In this manner, the batteries 126, 128 may provide higher processing power for running processing-intensive applications. In some instances, the processor(s) 102 may cause the first rechargeable battery 126 and the second rechargeable battery 128 to power the processor(s) 102 while the first rechargeable battery 126 and the second rechargeable battery 128 are connected in parallel. In this manner, the batteries 126, 128 may provide lower processing power for running basic applications.

By implementing the process of determining a voltage required for the processor(s) 102 to run an application on the mobile device 100, comparing the required voltage for running the application on the mobile device 100 and a voltage of the first rechargeable battery 126 or the second rechargeable battery 128, causing the first rechargeable battery 126 and the second rechargeable battery 128 to be connected in series or in parallel based at least in part on the comparison, and causing the first rechargeable battery 126 and the second rechargeable battery 128 to power the processor(s) 102 for running the application, embodiments of the disclosure may provide increased processing power, when needed, and may preserve battery life for prolonged use of the mobile device 100, when possible.

Figure 3A:
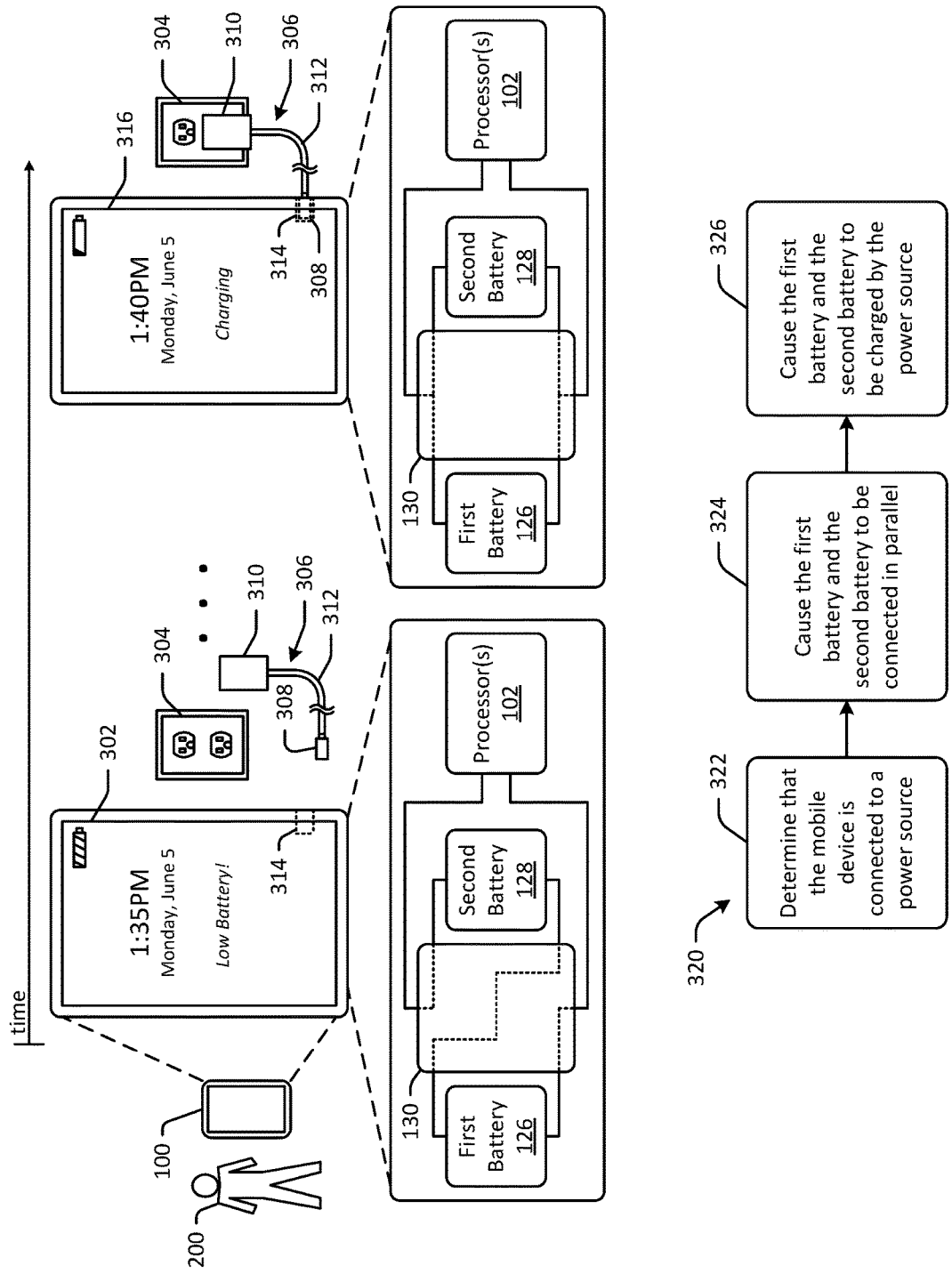
FIG. 3A is a hybrid system and process diagram illustrating managing power for a mobile device having multiple rechargeable batteries in accordance with one or more embodiments of the disclosure.

Referring to FIG. 3A, a hybrid system and process diagram illustrating managing power for a mobile device having multiple rechargeable batteries in accordance with one or more embodiments of the disclosure is depicted. As explained above, the mobile device 100 may be configured to manage power provided by and to multiple rechargeable batteries of the mobile device 100 by selectively changing a connection between the rechargeable batteries based at least in part on a charging state of the mobile device 100. In the example of FIG. 3A, the charge levels of the first rechargeable battery 126 and the second rechargeable battery 128 may become low following use of the mobile device 100 over an extended period of time, as indicated by content presented at a third user interface 302. Accordingly, the user 200 may connect the mobile device 100 to an external power source 304, such as a wall outlet. For example, the mobile device 100 may be connected to the external power source 304 via a charging device 306. In some embodiments, the charging device 306 may include a mobile device connector 308, a power source connector 310, and a cord 312 extending between the mobile device connector 308 and the power source connector 310. The mobile device connector 308 may be removably connected to an input/output (I/O) receptacle 314 of the mobile device 100, and the power source connector 310 may be removably connected to the external power source 304 to facilitate charging of the rechargeable batteries 126, 128. In the example of FIG. 3A, the first rechargeable battery 126 and the second rechargeable battery 128 may be connected in series, for example to allow the processor(s) 102 to run a processing-intensive application or otherwise, immediately prior to connecting the mobile device 100 to the external power source 304. The processor(s) 102 may determine that the mobile device 100 is connected to the external power source 304 and able to receive power therefrom. Upon such determination, the processor(s) 102 may cause the first rechargeable battery 126 and the second rechargeable battery 128 to be connected in parallel. In this manner, the batteries 126, 128 may be charged at the same time and in the same amount of time as would be required to charge only one of the batteries 126, 128. It will be appreciated that the configuration of the first rechargeable battery 126 and the second rechargeable battery 128 may cause the batteries 126, 128 to be charged at the same rate. Content presented at a fourth user interface 316 may indicate that the batteries 126, 128 are being charged.

To manage the power provided to the rechargeable batteries 126, 128 of the mobile device 100 based at least in part on a charging state of the mobile device 100, the one or more processor(s) 102 may execute one or more process flows. For example, an example process flow 320 for managing the power provided to the rechargeable batteries 126, 128 of the mobile device 100 is depicted in FIG. 3A. Although certain operations are illustrated as occurring separately in FIG. 3A, some or all of the operations may occur concurrently or partially concurrently. In some embodiments, the operations of the process flow 320 may be executed by one or more processor(s), such as the processor(s) 102 of the mobile device 100. In other embodiments, the operations of the process flow 320 may be executed by the processor(s) 332 of the charging device 306 described below.

At block 322 of the process flow 320, the processor(s) may determine that the mobile device 100 is connected to an external power source. For example, the processor(s) may determine that electric charge is flowing from the external power source 304 to the mobile device 100 via the charging device 306.

At block 324 of the process flow 320, the processor(s) may cause the first rechargeable battery 126 and the second rechargeable battery 128 to be connected in parallel based at least in part on the determination that the mobile device 100 is connected to the external power source 304. The processor(s) 102 may cause the one or more solid state relay(s) 130 to form the parallel connection between the first rechargeable battery 126 and the second rechargeable battery 128.

At block 326 of the process flow 320, the processor(s) may cause the first rechargeable battery 126 and the second rechargeable battery 128 to be charged by the external power source 304. In particular, the processor(s) 102 may cause the first rechargeable battery 126 and the second rechargeable battery 128 to be charged by the external power source 304 while the first rechargeable battery 126 and the second rechargeable battery 128 are connected in parallel.

By implementing the process of determining that the mobile device 100 is connected to the external power source 304, causing the first rechargeable battery 126 and the second rechargeable battery 128 to be connected in parallel based at least in part on the determination that the mobile device 100 is connected to the external power source 304, and causing the first rechargeable battery 126 and the second rechargeable battery 128 to be charged by the external power source 304 while the first rechargeable battery 126 and the second rechargeable battery 128 are connected in parallel, embodiments of the disclosure may allow the batteries 126, 128 to be charged in an efficient manner for subsequent use of the mobile device 100.

Figure 3B:
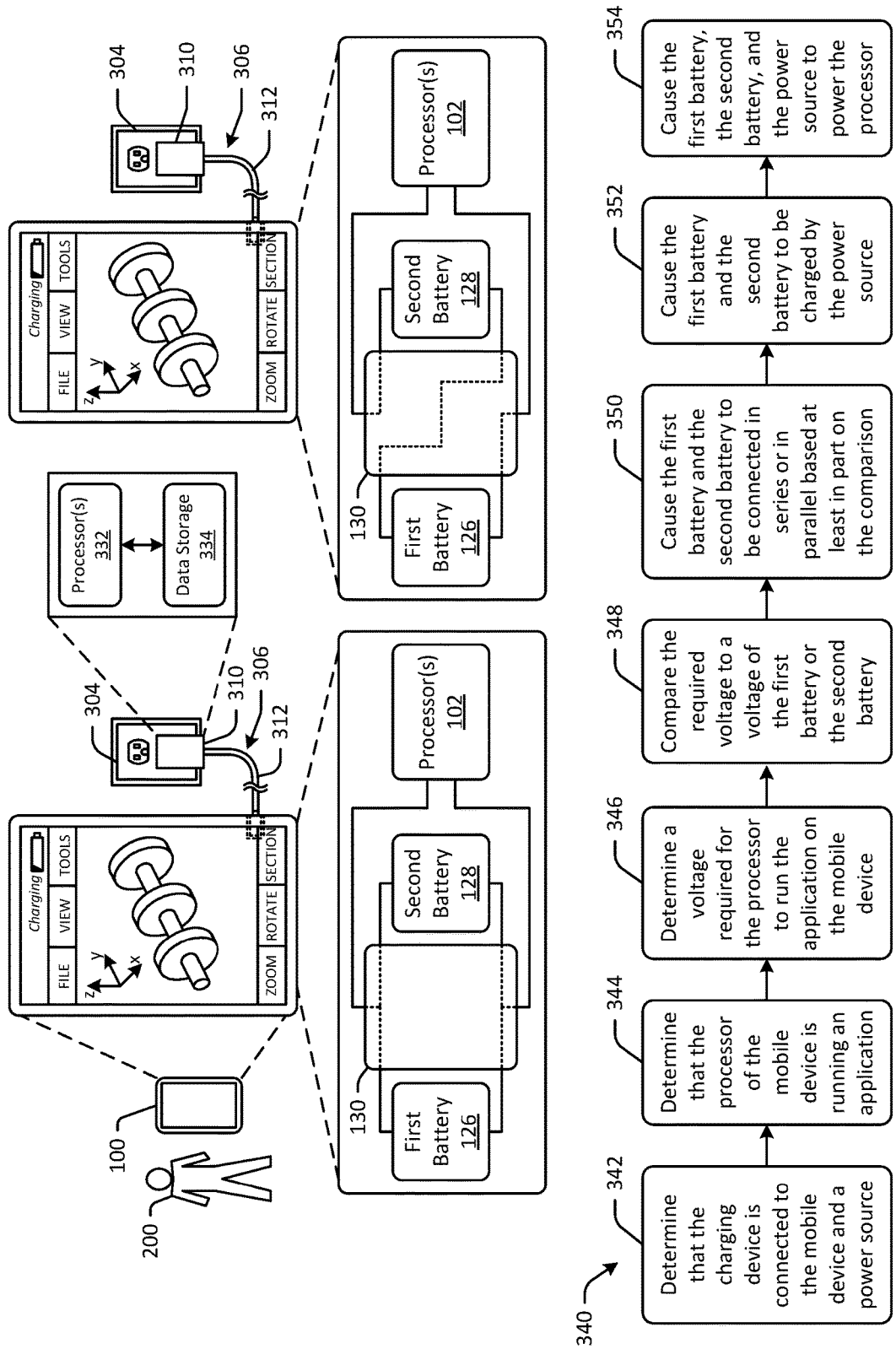
FIG. 3B is a hybrid system and process diagram illustrating managing power for a mobile device having multiple rechargeable batteries in accordance with one or more embodiments of the disclosure.

Referring to FIG. 3B, a hybrid system and process diagram illustrating managing power for a mobile device having multiple rechargeable batteries in accordance with one or more embodiments of the disclosure is depicted. As explained above, the mobile device 100 may be configured to manage power provided by and to multiple rechargeable batteries of the mobile device 100 by selectively changing a connection between the rechargeable batteries based at least in part on a particular application to be run on the mobile device 100 and a charging state of the mobile device 100. In the example of FIG. 3B, the user 200 may interact with the mobile device 100 to use a processing-intensive software application while the mobile device 100 is connected to the external power source 304 by the charging device 306. In some embodiments, the charging device 306 may include one or more processor(s) 332 and data storage 334, which generally may be configured in a manner similar to the processor(s) 102 and the data storage 114 described above. While the mobile device 100 is connected to the external power source 304 by the charging device 306 and while the processor(s) 102 is running the processing-intensive application, the processor(s) 332 may control charging of the rechargeable batteries 126, 128 as well as powering of the processor(s) 102. The processor(s) 332 may determine that the charging device 306 is connected to the mobile device 100 and the external power source 304. The processor(s) 332 also may determine that the processor(s) 102 is running the application or has received a user request to run the application on the mobile device 100. Upon such determination, the processor(s) 332 may determine a required voltage that is required for the processor(s) 102 to run the application. The processor(s) 332 also may determine a first voltage of the first rechargeable battery 126 and/or a second voltage of the second rechargeable battery 128. The processor(s) 332 may compare the first voltage of the first rechargeable battery 126 and the required voltage for running the application. The processor(s) 332 may determine that the first voltage of the first rechargeable battery 126 is less than the required voltage for running the application, for example, when the application is a processing-intensive application. In some instances, the processor(s) 332 may cause the solid state relay(s) 130 to form a parallel connection between the first rechargeable battery 126 and the second rechargeable battery 128, and the processor(s) 332 may cause the batteries 126, 128 to be charged by the external power source 304 while the batteries 126, 128 are connected in parallel. The processor(s) 332 also may cause the first rechargeable battery 126, the second rechargeable battery 128, and the external power source 304 to power the processor(s) 102 for running the application while the batteries 126, 128 are connected in parallel and while the batteries 126, 128 are being charged. For example, the processor(s) 332 may cause the first rechargeable battery 126 and the second rechargeable battery 128, connected in parallel with one another, to provide the first voltage, and the processor(s) 332 may cause the external power source 304, connected in series with the batteries 126, 128, to provide additional voltage such that the total voltage provided to the processor(s) 102 satisfies the required voltage for running the application. In some instances, the processor(s) 332 may cause the solid state relay(s) 130 to form a series connection between the first rechargeable battery 126 and the second rechargeable battery 128, and the processor(s) 332 may cause the batteries 126, 128 to be charged by the external power source 304 while the batteries 126, 128 are connected in series. The processor(s) 332 also may cause the first rechargeable battery 126, the second rechargeable battery 128, and the external power source 304 to power the processor(s) 102 for running the application while the batteries 126, 128 are connected in series and while the batteries 126, 128 are being charged. For example, the processor(s) 332 may cause the first rechargeable battery 126 and the second rechargeable battery 128, connected in series with one another, to provide twice the first voltage, and the processor(s) 332 may cause the external power source 304, connected to the processor(s) 102 via a separate circuit, to provide additional voltage such that the total voltage provided to the processor(s) 102 satisfies the required voltage for running the application.

To manage the power provided by and to the rechargeable batteries 126, 128 of the mobile device 100 based at least in part on a particular application to be run on the mobile device 100 and a charging state of the mobile device 100, the one or more processor(s) 332 may execute one or more process flows. For example, an example process flow 340 for managing the power provided by and to the rechargeable batteries 126, 128 of the mobile device 100 is depicted in FIG. 3B. Although certain operations are illustrated as occurring separately in FIG. 3B, some or all of the operations may occur concurrently or partially concurrently. In some embodiments, the operations of the process flow 340 may be executed by one or more processor(s), such as the processor(s) 332 of the charging device 306.

At block 342 of the process flow 340, the processor(s) 332 may determine that the charging device 306 is connected to the mobile device 100 and the external power source 304. For example, the processor(s) may determine that electric charge is flowing from the external power source 304 to the mobile device 100 via the charging device 306.

At block 344 of the process flow 340, the processor(s) 332 may determine that the processor(s) 102 is running an application or has received a user request to run an application on the mobile device 100.

At block 346 of the process flow 340, the processor(s) 332 may determine a voltage required for the processor(s) 102 to run the application on the mobile device 100. In some instances, data relating to the required voltage for running the application on the mobile device 100 may be stored at the power management module 124 of the data storage 114 or at a power management module of the data storage 334 and may be retrieved by the processor(s) 332.

At block 348 of the process flow 340, the processor(s) 332 may compare the required voltage for running the application on the mobile device 100 and a voltage of the first rechargeable battery 126 or the second rechargeable battery 128. For example, the processor(s) 332 may determine the voltage of the first rechargeable battery 126 or the voltage of the second rechargeable battery 128 and compare such voltage to the required voltage for running the application. In some instances, the voltage of the first rechargeable battery 126 (and the voltage of the second rechargeable battery 128) may be less than the required voltage for running the application.

At block 350 of the process flow 340, the processor(s) 332 may cause the first rechargeable battery 126 and the second rechargeable battery 128 to be connected in series or in parallel. In some instances in which the voltage of the first rechargeable battery 126 (and the voltage of the second rechargeable battery 128) is less than the required voltage for running the application, the processor(s) 332 may cause the first rechargeable battery 126 and the second rechargeable battery 128 to be connected in series. The processor(s) 332 may cause the one or more solid state relay(s) 130 to form the series connection between the first rechargeable battery 126 and the second rechargeable battery 128. In other instances in which the voltage of the first rechargeable battery 126 (and the voltage of the second rechargeable battery 128) is less than the required voltage for running the application, the processor(s) 332 may cause the first rechargeable battery 126 and the second rechargeable battery 128 to be connected in parallel. The processor(s) 332 may cause the one or more solid state relay(s) 130 to form the parallel connection between the first rechargeable battery 126 and the second rechargeable battery 128.

At block 352 of the process flow 340, the processor(s) 332 may cause the first rechargeable battery 126 and the second rechargeable battery 128 to be charged by the external power source 304. In some instances, the processor(s) 332 may cause the first rechargeable battery 126 and the second rechargeable battery 128 to be charged by the external power source 304 while the first rechargeable battery 126 and the second rechargeable battery 128 are connected in series. In other instances, the processor(s) 332 may cause the first rechargeable battery 126 and the second rechargeable battery 128 to be charged by the external power source 304 while the first rechargeable battery 126 and the second rechargeable battery 128 are connected in series.

At block 354 of the process flow 340, the processor(s) 332 may cause the first rechargeable battery 126, the second rechargeable battery 128, and the external power source 304 to power the processor(s) 102 for running the application. In some instances, the processor(s) 332 may cause the first rechargeable battery 126, the second rechargeable battery 128, and the external power source 304 to power the processor(s) 102 for running the application while the batteries 126, 128 are connected in parallel and while the batteries 126, 128 are being charged. For example, the processor(s) 332 may cause the first rechargeable battery 126 and the second rechargeable battery 128, connected in parallel with one another, to provide the first voltage, and the processor(s) 332 may cause the external power source 304, connected in series with the batteries 126, 128, to provide additional voltage such that the total voltage provided to the processor(s) 102 satisfies the required voltage for running the application. In other instances, the processor(s) 332 may cause the first rechargeable battery 126, the second rechargeable battery 128, and the external power source 304 to power the processor(s) 102 for running the application while the batteries 126, 128 are connected in series and while the batteries 126, 128 are being charged. For example, the processor(s) 332 may cause the first rechargeable battery 126 and the second rechargeable battery 128, connected in series with one another, to provide twice the first voltage, and the processor(s) 332 may cause the external power source 304, connected to the processor(s) 102 via a separate circuit, to provide additional voltage such that the total voltage provided to the processor(s) 102 satisfies the required voltage for running the application.

By implementing the process of determining that the charging device 306 is connected to the mobile device 100 and the external power source 304, determining that the processor(s) 102 is running an application or has received a user request to run an application on the mobile device 100, determining a voltage required for the processor(s) 102 to run the application on the mobile device 100, comparing the required voltage for running the application on the mobile device 100 and a voltage of the first rechargeable battery 126 or the second rechargeable battery 128, causing the first rechargeable battery 126 and the second rechargeable battery 128 to be connected in series or in parallel, causing the first rechargeable battery 126 and the second rechargeable battery 128 to be charged by the external power source 304, and causing the first rechargeable battery 126, the second rechargeable battery 128, and the external power source 304 to power the processor(s) 102 for running the application, embodiments of the disclosure may provide increased processing power, when needed while the mobile device 100 is connected to the external power source 304, while also allowing the batteries 126, 128 to be charged in an efficient manner for subsequent use of the mobile device 100 when the mobile device 100 is no longer connected to the external power source 304.

Figure 4:
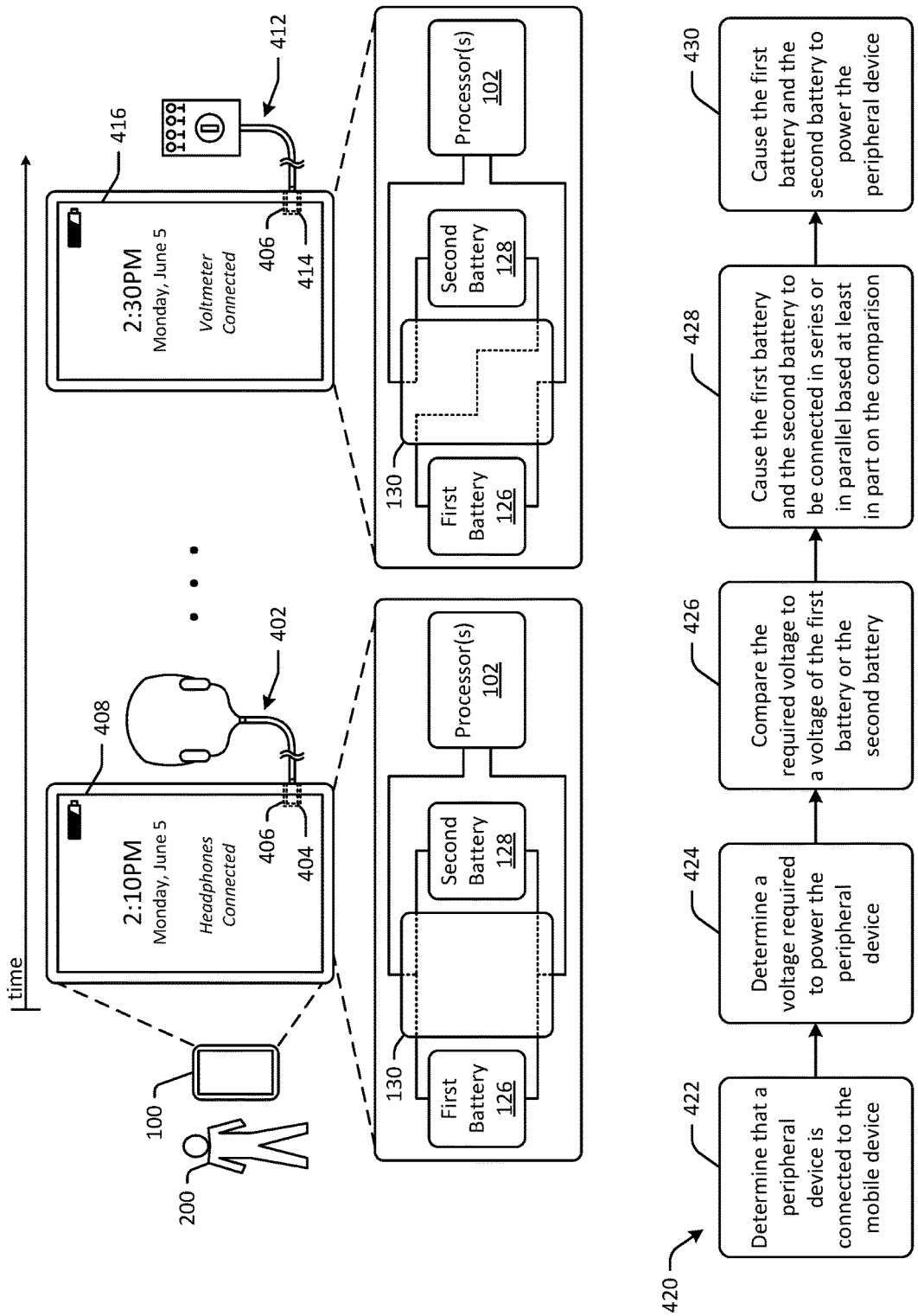
FIG. 4 is a hybrid system and process diagram illustrating managing power for a mobile device having multiple rechargeable batteries in accordance with one or more embodiments of the disclosure.

Referring to FIG. 4, a hybrid system and process diagram illustrating managing power for a mobile device having multiple rechargeable batteries in accordance with one or more embodiments of the disclosure is depicted. As explained above, the mobile device 100 may be configured to manage power provided by the rechargeable batteries of the mobile device 100 by selectively changing a connection between the rechargeable batteries based at least in part on a particular peripheral device connected to the mobile device 100. In the example of FIG. 4, the user 200 may connect a first peripheral device 402 to the mobile device 100. In one embodiment, the first peripheral device 402 may be a low-power device, such as a set of headphones. The first peripheral device 402 may be connected to the mobile device 100 by removably connecting a mobile device connector 404 of the first peripheral device 402 to an input/output (I/O) receptacle 406 of the mobile device 100. In some embodiments, the input/output (I/O) receptacle 406 may be the same as the input/output (I/O) receptacle 314 described above. The processor(s) 102 may determine that the first peripheral device 402 is connected to the mobile device 100. For example, the processor(s) 102 may determine that the mobile device connector 404 is connected to the input/output (I/O) receptacle 406, as may be indicated by content presented at a fifth user interface 408. Upon such determination, the processor(s) 102 may determine a first required voltage that is required for powering the first peripheral device 402. In some embodiments, data relating to respective required voltages to power peripheral devices connectable to the mobile device 100 may be stored at the data storage 114, for example at the power management module(s) 124, and accessible to the processor(s) 102. The processor(s) 102 also may determine a first voltage of the first rechargeable battery 126 and/or a second voltage of the second rechargeable battery 128. It will be appreciated that the configuration of the first rechargeable battery 126 and the second rechargeable battery 128 may cause the batteries 126, 128 to discharge at the same rate and to be charged at the same rate. Accordingly, the processor(s) 102 may determine only the first voltage of the first rechargeable battery 126 or the second voltage of the second rechargeable battery 128. The processor(s) 102 may compare the first voltage of the first rechargeable battery 126 and the first required voltage for powering the first peripheral device 402. In some instances, the processor(s) 102 may determine that the first voltage of the first rechargeable battery 126 is greater than the first required voltage for powering the first peripheral device 402. In the example of FIG. 4, the first peripheral device 402 may be a low-power device, such as a set of headphones, and the first required voltage may be less than the first voltage of the first rechargeable battery 126 (and less than the second voltage of the second rechargeable battery 128). As a result, the processor(s) 102 may cause the solid state relay(s) 130 to form a parallel connection between the first rechargeable battery 126 and the second rechargeable battery 128 (it will be appreciated that the parallel connection shown by dashed lines is for illustration purposes only and does not reflect the configuration of the solid state relay(s) 130). The first rechargeable battery 126 and the second rechargeable battery 128 may power the first peripheral device 402 while the batteries 126, 128 are connected in parallel. The parallel connection between the first rechargeable battery 126 and the second rechargeable battery 128 may be maintained while the batteries 126, 128 continue to power the first peripheral device 402.

In the example of FIG. 4, the user 200 subsequently may connect a second peripheral device 412 to the mobile device 100. In one embodiment, the second peripheral device 412 may be a high-power device, such as a voltmeter, a Taser, or a DSLR flash. The second peripheral device 412 may be connected to the mobile device 100 by removably connecting a mobile device connector 414 of the second peripheral device 412 to the input/output (I/O) receptacle 406. The processor(s) 102 may determine that the second peripheral device 412 is connected to the mobile device 100. For example, the processor(s) 102 may determine that the mobile device connector 414 is connected to the input/output (I/O) receptacle 406, as may be indicated by content presented at a sixth user interface 416. Upon such determination, the processor(s) 102 may determine a second required voltage that is required for powering the second peripheral device 412. The processor(s) 102 also may determine a first voltage of the first rechargeable battery 126 and/or a second voltage of the second rechargeable battery 128. The processor(s) 102 may compare the first voltage of the first rechargeable battery 126 and the second required voltage for powering the second peripheral device 412. In some instances, the processor(s) 102 may determine that the first voltage of the first rechargeable battery 126 is less than the second required voltage for powering the second peripheral device 412. In the example of FIG. 4, the second peripheral device 412 may be a high-power device, such as a voltmeter, a Taser, or a DSLR flash, and the second required voltage may be greater than the first voltage of the first rechargeable battery 126 (and greater than the second voltage of the second rechargeable battery 128). As a result, the processor(s) 102 may cause the solid state relay(s) 130 to form a series connection between the first rechargeable battery 126 and the second rechargeable battery 128 (it will be appreciated that the series connection shown by dashed lines is for illustration purposes only and does not reflect the configuration of the solid state relay(s) 130). The first rechargeable battery 126 and the second rechargeable battery 128 may power the second peripheral device 412 while the batteries 126, 128 are connected in series. The series connection between the first rechargeable battery 126 and the second rechargeable battery 128 may be maintained while the batteries 126, 128 continue to power the second peripheral device 412.

To manage the power provided by the rechargeable batteries 126, 128 of the mobile device 100 based at least in part on a particular peripheral device connected to the mobile device 100, the one or more processor(s) 102 may execute one or more process flows. For example, an example process flow 420 for managing the power provided by the rechargeable batteries 126, 128 of the mobile device 100 is depicted in FIG. 4.

At block 422 of the process flow 420, the processor(s) 102 may determine that a peripheral device is connected to the mobile device 100. For example, the processor(s) 102 may determine that a mobile device connector of the peripheral device is connected to an input/output (I/O) receptacle of the mobile device 100.

At block 424 of the process flow 420, the processor(s) 102 may determine a voltage required for powering the peripheral device. In some instances, data relating to the required voltage for powering the peripheral device may be stored at the power management module 124 of the data storage 114 and may be retrieved by the processor(s) 102.

At block 426 of the process flow 420, the processor(s) 102 may compare the required voltage for powering the peripheral device and a voltage of the first rechargeable battery 126 or the second rechargeable battery 128. For example, the processor(s) 102 may determine the voltage of the first rechargeable battery 126 or the voltage of the second rechargeable battery 128 and compare such voltage to the required voltage for powering the peripheral device. In some instances, the voltage of the first rechargeable battery 126 (and the voltage of the second rechargeable battery 128) may be less than the required voltage for powering the peripheral device. In some instances, voltage of the first rechargeable battery 126 (and the voltage of the second rechargeable battery 128) may be greater than the required voltage for powering the peripheral device.

At block 428 of the process flow 420, the processor(s) 102 may cause the first rechargeable battery 126 and the second rechargeable battery 128 to be connected in series or in parallel based at least in part on the comparison of the required voltage for powering the peripheral device and the voltage of the first rechargeable battery 126 or the second rechargeable battery 128. In instances in which the voltage of the first rechargeable battery 126 (and the voltage of the second rechargeable battery 128) is less than the required voltage for powering the peripheral device, the processor(s) 102 may cause the first rechargeable battery 126 and the second rechargeable battery 128 to be connected in series. The processor(s) 102 may cause the one or more solid state relay(s) 130 to form the series connection between the first rechargeable battery 126 and the second rechargeable battery 128. In instances in which the voltage of the first rechargeable battery 126 (and the voltage of the second rechargeable battery 128) is greater than the required voltage for powering the peripheral device, the processor(s) 102 may cause the first rechargeable battery 126 and the second rechargeable battery 128 to be connected in parallel. The processor(s) 102 may cause the one or more solid state relay(s) 130 to form the parallel connection between the first rechargeable battery 126 and the second rechargeable battery 128.

At block 430 of the process flow 420, the processor(s) 102 may cause the first rechargeable battery 126 and the second rechargeable battery 128 to power the peripheral device. In some instances, the processor(s) 102 may cause the first rechargeable battery 126 and the second rechargeable battery 128 to power the peripheral device while the first rechargeable battery 126 and the second rechargeable battery 128 are connected in series. In this manner, the batteries 126, 128 may provide higher power for high-power peripheral devices. In some instances, the processor(s) 102 may cause the first rechargeable battery 126 and the second rechargeable battery 128 to power the peripheral device while the first rechargeable battery 126 and the second rechargeable battery 128 are connected in parallel. In this manner, the batteries 126, 128 may provide lower power for low-power peripheral devices.

By implementing the process of determining a voltage required for powering a peripheral device, comparing the required voltage for powering the peripheral device and a voltage of the first rechargeable battery 126 or the second rechargeable battery 128, causing the first rechargeable battery 126 and the second rechargeable battery 128 to be connected in series or in parallel based at least in part on the comparison, and causing the first rechargeable battery 126 and the second rechargeable battery 128 to power the peripheral device, embodiments of the disclosure may provide increased power to peripheral devices, when needed, and may preserve battery life for prolonged use of the mobile device 100, when possible.

Figure 5:
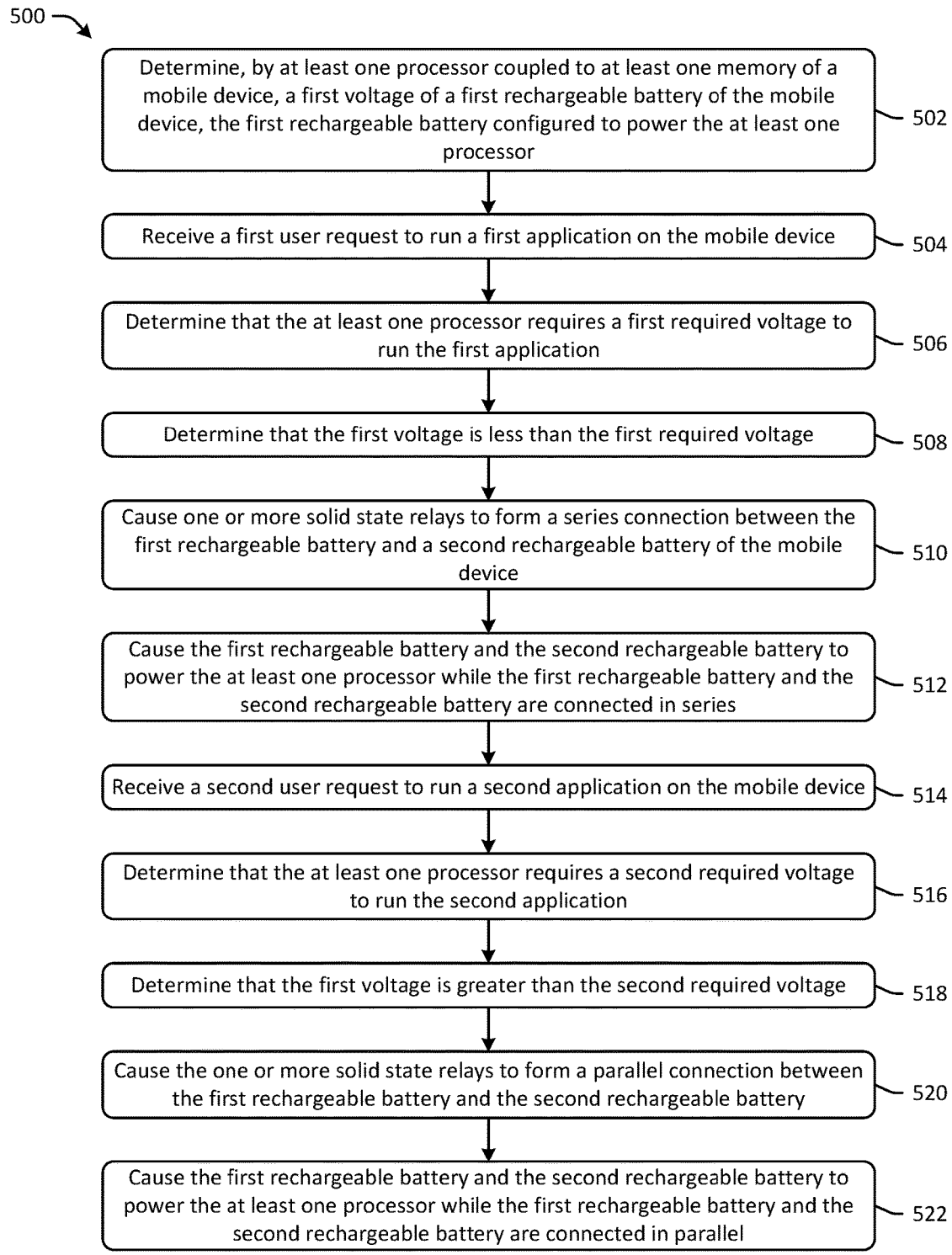
FIG. 5 is an example process flow diagram for managing power for a mobile device having multiple rechargeable batteries in accordance with one or more embodiments of the disclosure.

Referring to FIG. 5, an example process flow 500 for managing power for a mobile device having multiple rechargeable batteries in accordance with one or more embodiments of the disclosure is depicted. Although certain operations are illustrated as occurring separately in FIG. 5, some or all of the operations may occur concurrently or partially concurrently. In some embodiments, the operations of the process flow 500 may be executed by one or more processor(s), such as the processor(s) 102 of the mobile device 100.

At block 502 of the process flow 500, a first voltage of a first rechargeable battery of a mobile device may be determined, the first rechargeable battery configured to power at least one processor of the mobile device. For example, computer-executable instructions of one or more power management module(s) stored at the mobile device may be executed to determine a first voltage of a first rechargeable battery of the mobile device. The first rechargeable battery configured to power at least one processor of the mobile device. In some embodiments, the at least one processor of the mobile device may determine a first voltage of a first rechargeable battery of the mobile device.

At block 504 of the process flow 500, a first user request to run a first application on the mobile device may be received. For example, computer-executable instructions of one or more power management module(s) stored at the mobile device may be executed to receive a first user request to run a first application on the mobile device. In some embodiments, the at least one processor of the mobile device may receive a first user request to run a first application on the mobile device.

At block 506 of the process flow 500, it may be determined that the at least one processor requires a first required voltage to run the first application. For example, computer-executable instructions of one or more power management module(s) stored at the mobile device may be executed to determine that the at least one processor requires a first required voltage to run the first application. In some embodiments, the at least one processor of the mobile device may determine that the at least one processor requires a first required voltage to run the first application.

At block 508 of the process flow 500, it may be determined that the first voltage is less than the first required voltage. For example, computer-executable instructions of one or more power management module(s) stored at the mobile device may be executed to determine that the first voltage is less than the first required voltage. In some embodiments, the at least one processor of the mobile device may determine that the first voltage is less than the first required voltage.

At block 510 of the process flow 500, one or more solid state relays may be caused to form a series connection between the first rechargeable battery and a second rechargeable battery of the mobile device. For example, computer-executable instructions of one or more power management module(s) stored at the mobile device may be executed to cause one or more solid state relays to form a series connection between the first rechargeable battery and a second rechargeable battery of the mobile device. In some embodiments, the at least one processor of the mobile device may cause one or more solid state relays to form a series connection between the first rechargeable battery and a second rechargeable battery of the mobile device.

At block 512 of the process flow 500, the first rechargeable battery and the second rechargeable battery may be caused to power the at least one processor while the first rechargeable battery and the second rechargeable battery are connected in series. For example, computer-executable instructions of one or more power management module(s) stored at the mobile device may be executed to cause the first rechargeable battery and the second rechargeable battery to power the at least one processor while the first rechargeable battery and the second rechargeable battery are connected in series. In some embodiments, the at least one processor of the mobile device may cause the first rechargeable battery and the second rechargeable battery to power the at least one processor while the first rechargeable battery and the second rechargeable battery are connected in series.

At block 514 of the process flow 500, a second user request to run a second application on the mobile device may be received. For example, computer-executable instructions of one or more power management module(s) stored at the mobile device may be executed to receive a second user request to run a second application on the mobile device. In some embodiments, the at least one processor of the mobile device may receive a second user request to run a second application on the mobile device.

At block 516 of the process flow 500, it may be determined that the at least one processor requires a second required voltage to run the second application. For example, computer-executable instructions of one or more power management module(s) stored at the mobile device may be executed to determine that the at least one processor requires a second required voltage to run the second application. In some embodiments, the at least one processor of the mobile device may determine that the at least one processor requires a second required voltage to run the second application.

At block 518 of the process flow 500, it may be determined that the first voltage is greater than the second required voltage. For example, computer-executable instructions of one or more power management module(s) stored at the mobile device may be executed to determine that the first voltage is greater than the second required voltage. In some embodiments, the at least one processor of the mobile device may determine that the first voltage is greater than the second required voltage.

At block 520 of the process flow 500, the one or more solid state relays may be caused to form a parallel connection between the first rechargeable battery and the second rechargeable battery. For example, computer-executable instructions of one or more power management module(s) stored at the mobile device may be executed to cause the one or more solid state relays to form a parallel connection between the first rechargeable battery and the second rechargeable battery. In some embodiments, the at least one processor of the mobile device may cause the one or more solid state relays to form a parallel connection between the first rechargeable battery and the second rechargeable battery.

At block 522 of the process flow 500, the first rechargeable battery and the second rechargeable battery may be caused to power the at least one processor while the first rechargeable battery and the second rechargeable battery are connected in parallel. For example, computer-executable instructions of one or more power management module(s) stored at the mobile device may be executed to cause the first rechargeable battery and the second rechargeable battery to power the at least one processor while the first rechargeable battery and the second rechargeable battery are connected in parallel. In some embodiments, the at least one processor of the mobile device may cause the first rechargeable battery and the second rechargeable battery to power the at least one processor while the first rechargeable battery and the second rechargeable battery are connected in parallel.

Figure 6:
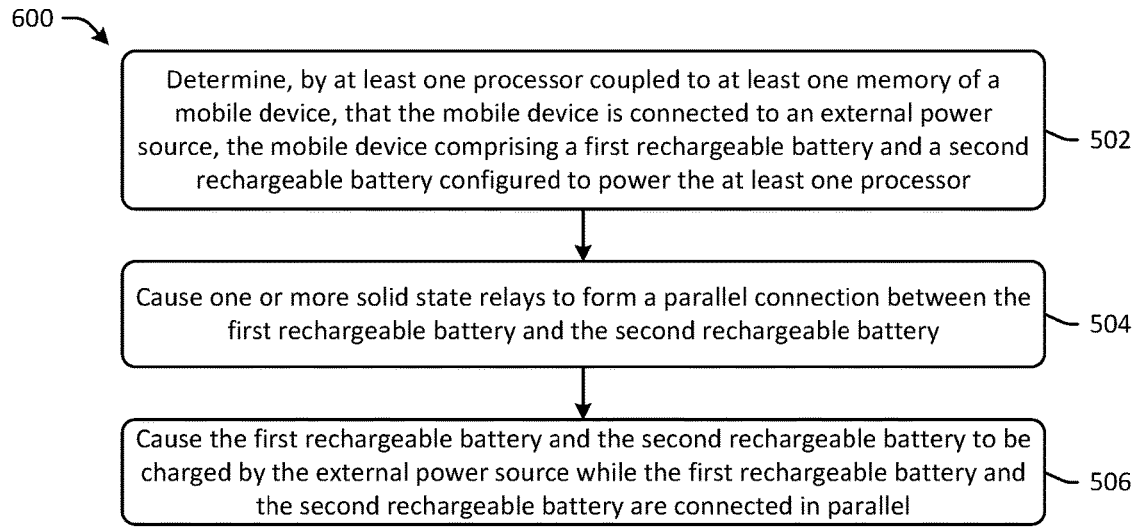
FIG. 6 is an example process flow diagram for managing power for a mobile device having multiple rechargeable batteries in accordance with one or more embodiments of the disclosure.

Referring to FIG. 6, an example process flow 600 for managing power for a mobile device having multiple rechargeable batteries in accordance with one or more embodiments of the disclosure is depicted. Although certain operations are illustrated as occurring separately in FIG. 6, some or all of the operations may occur concurrently or partially concurrently. In some embodiments, the operations of the process flow 600 may be executed by one or more processor(s), such as the processor(s) 102 of the mobile device 100.

At block 602 of the process flow 600, it may be determined that a mobile device is connected to an external power source, the mobile device including a first rechargeable battery and a second rechargeable battery configured to power at least one processor of the mobile device. For example, computer-executable instructions of one or more power management module(s) stored at the mobile device may be executed to determine that a mobile device is connected to an external power source. The mobile device may include a first rechargeable battery and a second rechargeable battery configured to power at least one processor of the mobile device. In some embodiments, the at least one processor of the mobile device may determine that the mobile device is connected to an external power source.

At block 604 of the process flow 600, one or more solid state relays of the mobile device may be caused to form a parallel connection between the first rechargeable battery and the second rechargeable battery. For example, computer-executable instructions of one or more power management module(s) stored at the mobile device may be executed to cause one or more solid state relays to form a parallel connection between the first rechargeable battery and the second rechargeable battery. In some embodiments, the at least one processor of the mobile device may cause one or more solid state relays to form a parallel connection between the first rechargeable battery and the second rechargeable battery.

At block 606 of the process flow 600, the first rechargeable battery and the second rechargeable battery may be caused to be charged while the first rechargeable battery and the second rechargeable battery are connected in parallel. For example, computer-executable instructions of one or more power management module(s) stored at the mobile device may be executed to cause the first rechargeable battery and the second rechargeable battery to be charged while the first rechargeable battery and the second rechargeable battery are connected in parallel. In some embodiments, the at least one processor of the mobile device may cause the first rechargeable battery and the second rechargeable battery to be charged while the first rechargeable battery and the second rechargeable battery are connected in parallel.

Figure 7:
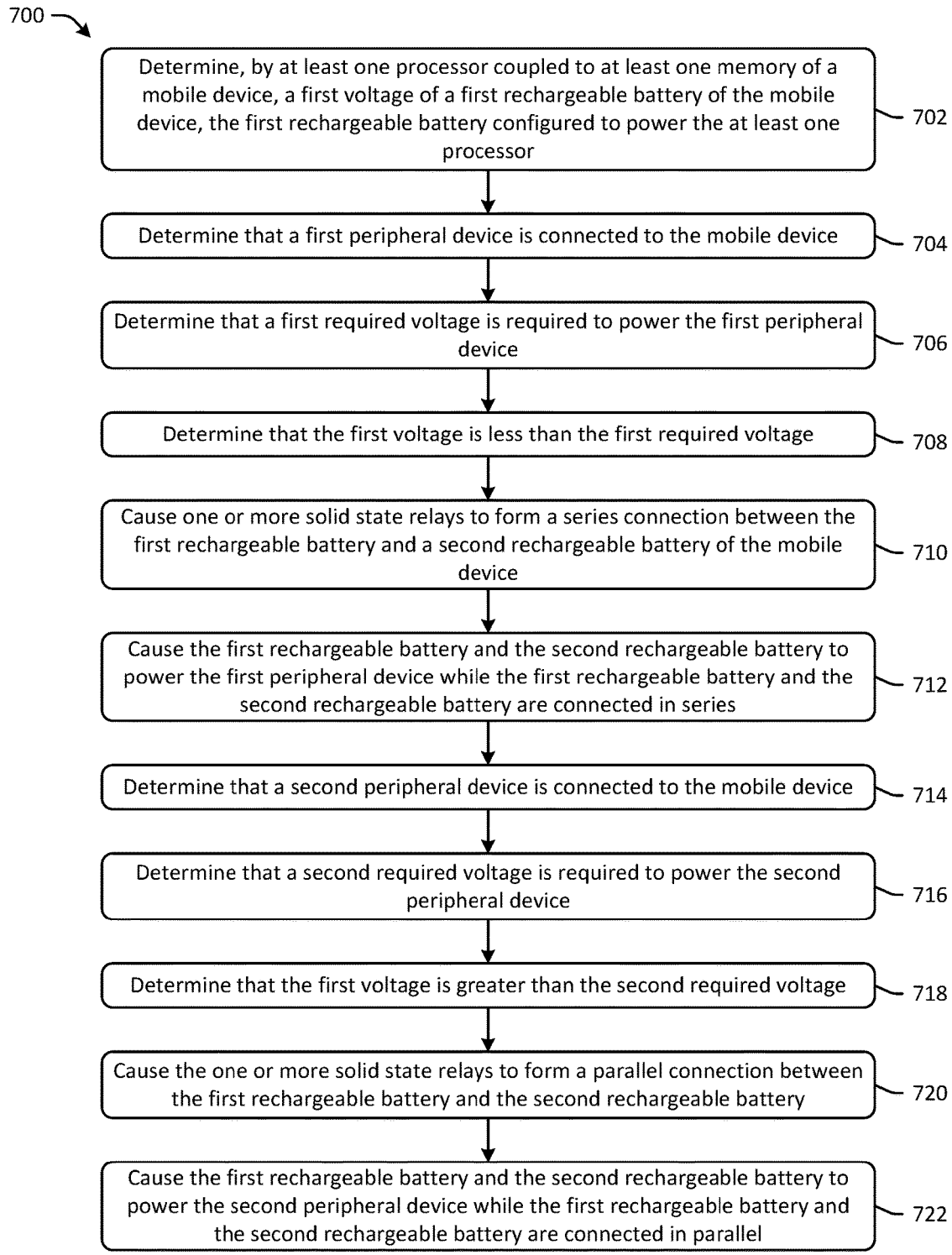
FIG. 7 is an example process flow diagram for managing power for a mobile device having multiple rechargeable batteries in accordance with one or more embodiments of the disclosure.

Referring to FIG. 7, an example process flow 700 for managing power for a mobile device having multiple rechargeable batteries in accordance with one or more embodiments of the disclosure is depicted. Although certain operations are illustrated as occurring separately in FIG. 7, some or all of the operations may occur concurrently or partially concurrently. In some embodiments, the operations of the process flow 700 may be executed by one or more processor(s), such as the processor(s) 102 of the mobile device 100.

At block 702 of the process flow 700, a first voltage of a first rechargeable battery of a mobile device may be determined, the first rechargeable battery configured to power at least one processor of the mobile device. For example, computer-executable instructions of one or more power management module(s) stored at the mobile device may be executed to determine a first voltage of a first rechargeable battery of the mobile device. The first rechargeable battery configured to power at least one processor of the mobile device. In some embodiments, the at least one processor of the mobile device may determine a first voltage of a first rechargeable battery of the mobile device.

At block 704 of the process flow 700, it may be determined that a first peripheral device is connected to the mobile device. For example, computer-executable instructions of one or more power management module(s) stored at the mobile device may be executed to determine that a first peripheral device is connected to the mobile device. In some embodiments, the at least one processor of the mobile device may determine that a first peripheral device is connected to the mobile device.

At block 706 of the process flow 700, it may be determined that a first required voltage is required to power the first peripheral device. For example, computer-executable instructions of one or more power management module(s) stored at the mobile device may be executed to determine that a first required voltage is required to power the first peripheral device. In some embodiments, the at least one processor of the mobile device may determine that a first required voltage is required to power the first peripheral device.

At block 708 of the process flow 700, it may be determined that the first voltage is less than the first required voltage. For example, computer-executable instructions of one or more power management module(s) stored at the mobile device may be executed to determine that the first voltage is less than the first required voltage. In some embodiments, the at least one processor of the mobile device may determine that the first voltage is less than the first required voltage.

At block 710 of the process flow 700, one or more solid state relays may be caused to form a series connection between the first rechargeable battery and a second rechargeable battery of the mobile device. For example, computer-executable instructions of one or more power management module(s) stored at the mobile device may be executed to cause one or more solid state relays to form a series connection between the first rechargeable battery and a second rechargeable battery of the mobile device. In some embodiments, the at least one processor of the mobile device may cause one or more solid state relays to form a series connection between the first rechargeable battery and a second rechargeable battery of the mobile device.

At block 712 of the process flow 700, the first rechargeable battery and the second rechargeable battery may be caused to power the first peripheral device while the first rechargeable battery and the second rechargeable battery are connected in series. For example, computer-executable instructions of one or more power management module(s) stored at the mobile device may be executed to cause the first rechargeable battery and the second rechargeable battery to power the first peripheral device while the first rechargeable battery and the second rechargeable battery are connected in series. In some embodiments, the at least one processor of the mobile device may cause the first rechargeable battery and the second rechargeable battery to power the first peripheral device while the first rechargeable battery and the second rechargeable battery are connected in series.

At block 714 of the process flow 700, it may be determined that a second peripheral device is connected to the mobile device. For example, computer-executable instructions of one or more power management module(s) stored at the mobile device may be executed to determine that a second peripheral device is connected to the mobile device. In some embodiments, the at least one processor of the mobile device may determine that a second peripheral device is connected to the mobile device.

At block 716 of the process flow 700, it may be determined that a second required voltage is required to power the second peripheral device. For example, computer-executable instructions of one or more power management module(s) stored at the mobile device may be executed to determine that a second required voltage is required to power the second peripheral device. In some embodiments, the at least one processor of the mobile device may determine that a second required voltage is required to power the second peripheral device.

At block 718 of the process flow 700, it may be determined that the first voltage is greater than the second required voltage. For example, computer-executable instructions of one or more power management module(s) stored at the mobile device may be executed to determine that the first voltage is greater than the second required voltage. In some embodiments, the at least one processor of the mobile device may determine that the first voltage is greater than the second required voltage.

At block 720 of the process flow 700, the one or more solid state relays may be caused to form a series connection between the first rechargeable battery and the second rechargeable battery. For example, computer-executable instructions of one or more power management module(s) stored at the mobile device may be executed to cause the one or more solid state relays to form a series connection between the first rechargeable battery and the second rechargeable battery. In some embodiments, the at least one processor of the mobile device may cause the one or more solid state relays to form a series connection between the first rechargeable battery and the second rechargeable battery.

At block 722 of the process flow 700, the first rechargeable battery and the second rechargeable battery may be caused to power the second peripheral device while the first rechargeable battery and the second rechargeable battery are connected in parallel. For example, computer-executable instructions of one or more power management module(s) stored at the mobile device may be executed to cause the first rechargeable battery and the second rechargeable battery to power the second peripheral device while the first rechargeable battery and the second rechargeable battery are connected in parallel. In some embodiments, the at least one processor of the mobile device may cause the first rechargeable battery and the second rechargeable battery to power the second peripheral device while the first rechargeable battery and the second rechargeable battery are connected in parallel.

The operations described and depicted in the illustrative methods, process flows, and use cases of FIGS. 2-7 may be carried out or performed in any suitable order, such as the depicted orders, as desired in various example embodiments of the disclosure. Additionally, in certain example embodiments, at least a portion of the operations may be carried out in parallel. Furthermore, in certain example embodiments, less, more, or different operations than those depicted in FIGS. 2-7 may be performed.

Although specific embodiments of the disclosure have been described, one of ordinary skill in the art will recognize that numerous other modifications and alternative embodiments are within the scope of the disclosure. For example, any of the functionality and/or processing capabilities described with respect to a particular device or component may be performed by any other device or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure.

Certain aspects of the disclosure are described above with reference to block and flow diagrams of systems, methods, apparatuses, and/or computer program products according to example embodiments. It will be understood that one or more blocks of the block diagrams and flow diagrams, and combinations of blocks in the block diagrams and the flow diagrams, respectively, may be implemented by execution of computer-executable program instructions. Likewise, some blocks of the block diagrams and flow diagrams may not necessarily need to be performed in the order presented, or may not necessarily need to be performed at all, according to some embodiments. Further, additional components and/or operations beyond those depicted in blocks of the block and/or flow diagrams may be present in certain embodiments.

Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

Program module(s), applications, or the like disclosed herein may include one or more software components including, for example, software objects, methods, data structures, or the like. Each such software component may include computer-executable instructions that, responsive to execution, cause at least a portion of the functionality described herein (e.g., one or more operations of the illustrative methods described herein) to be performed.

A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform.

Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, or a report writing language. In one or more example embodiments, a software component comprising instructions in one of the foregoing examples of programming languages may be executed directly by an operating system or other software component without having to be first transformed into another form.

A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

Software components may invoke or be invoked by other software components through any of a wide variety of mechanisms. Invoked or invoking software components may comprise other custom-developed application software, operating system functionality (e.g., device drivers, data storage (e.g., file management) routines, other common routines and services, etc.), or third-party software components (e.g., middleware, encryption, or other security software, database management software, file transfer or other network communication software, mathematical or statistical software, image processing software, and format translation software).

Software components associated with a particular solution or system may reside and be executed on a single platform or may be distributed across multiple platforms. The multiple platforms may be associated with more than one hardware vendor, underlying chip technology, or operating system. Furthermore, software components associated with a particular solution or system may be initially written in one or more programming languages, but may invoke software components written in another programming language.

Computer-executable program instructions may be loaded onto a special-purpose computer or other particular machine, a processor, or other programmable data processing apparatus to produce a particular machine, such that execution of the instructions on the computer, processor, or other programmable data processing apparatus causes one or more functions or operations specified in the flow diagrams to be performed. These computer program instructions may also be stored in a computer-readable storage medium (CRSM) that upon execution may direct a computer or other programmable data processing apparatus to function in a particular manner, such that the instructions stored in the computer-readable storage medium produce an article of manufacture including instruction means that implement one or more functions or operations specified in the flow diagrams. The computer program instructions may also be loaded onto a computer or other programmable data processing apparatus to cause a series of operational elements or steps to be performed on the computer or other programmable apparatus to produce a computer-implemented process.

Additional types of CRSM that may be present in any of the devices described herein may include, but are not limited to, programmable random access memory (PRAM), SRAM, DRAM, RAM, ROM, electrically erasable programmable read-only memory (EEPROM), flash memory or other memory technology, compact disc read-only memory (CD-ROM), digital versatile disc (DVD) or other optical storage, magnetic cassettes, magnetic tape, magnetic disk storage or other magnetic storage devices, or any other medium which can be used to store the information and which can be accessed. Combinations of any of the above are also included within the scope of CRSM. Alternatively, computer-readable communication media (CRCM) may include computer-readable instructions, program module(s), or other data transmitted within a data signal, such as a carrier wave, or other transmission. However, as used herein, CRSM does not include CRCM.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment. The term "based at least in part on" and "based on" are synonymous terms which may be used interchangeably herein.

That which is claimed is:

1. A mobile device comprising:
    at least one memory that stores computer-executable instructions;
    at least one processor configured to access the at least one memory and execute the computer-executable instructions;
    a first rechargeable battery configured to power the at least one processor;
    a second rechargeable battery configured to power the at least one processor; and
    one or more MOSFETs electrically coupled to the first rechargeable battery and the second rechargeable battery, the one or more MOSFETs configured to transition between a first state in which the one or more MOSFETs form a series connection between the first rechargeable battery and the second rechargeable battery and a second state in which the one or more MOSFETs form a parallel connection between the first rechargeable battery and the second rechargeable battery;
    wherein the at least one processor is configured to access the at least one memory and execute the computer-executable instructions to:
        determine a first voltage of the first rechargeable battery;
        receive a first user request to run a first application on the mobile device;
        determine that the at least one processor requires a first required voltage to run the first application;
        determine that the first voltage is less than the first required voltage;
        cause the one or more MOSFETs to form the series connection between the first rechargeable battery and the second rechargeable battery;
        cause the first rechargeable battery and the second rechargeable battery to power the at least one processor while the first rechargeable battery and the second rechargeable battery are connected in series;
        determine that the mobile device is connected to an external power source;

cause the one or more MOSFETs to form the parallel connection between the first rechargeable battery and the second rechargeable battery; and cause the first rechargeable battery and the second rechargeable battery to be charged by the external power source while the first rechargeable battery and the second rechargeable battery are connected in parallel.

2. The mobile device of claim 1, wherein the at least one processor is configured to access the at least one memory and execute the computer-executable instructions to:

receive a second user request to run a second application on the mobile device;

determine that the at least one processor requires a second required voltage to run the second application;

determine that the first voltage is greater than the second required voltage;

cause the one or more MOSFETs to form the parallel connection between the first rechargeable battery and the second rechargeable battery; and cause the first rechargeable battery and the second rechargeable battery to power the at least one processor while the first rechargeable battery and the second rechargeable battery are connected in parallel.

3. The mobile device of claim 1, wherein the at least one processor is configured to access the at least one memory and execute the computer-executable instructions to:

determine that a peripheral device is connected to the mobile device;

determine a second required voltage to power the peripheral device;

determine that the first voltage is less than the second required voltage;

cause the one or more MOSFETs to form the series connection between the first rechargeable battery and the second rechargeable battery; and cause the first rechargeable battery and the second rechargeable battery to power the peripheral device while the first rechargeable battery and the second rechargeable battery are connected in series.

4. The mobile device of claim 1, further comprising a housing, wherein the at least one memory, the at least one processor, the first rechargeable battery, the second rechargeable battery, and the one or more MOSFETs are enclosed within the housing.

5. A mobile device comprising:
at least one memory that stores computer-executable instructions;
at least one processor configured to access the at least one memory and execute the computer-executable instructions;
a first rechargeable battery configured to power the at least one processor;
a second rechargeable battery configured to power the at least one processor; and
one or more solid state relays electrically coupled to the first rechargeable battery and the second rechargeable battery, the one or more solid state relays configured to transition between a first state in which the one or more solid state relays form a series connection between the first rechargeable battery and the second rechargeable battery and a second state in which the one or more solid state relays form a parallel connection between the first rechargeable battery and the second rechargeable battery.

6. The mobile device of claim 5, wherein the at least one processor is configured to access the at least one memory and execute the computer-executable instructions to:

cause the one or more solid state relays to form the series connection between the first rechargeable battery and the second rechargeable battery during discharging of the first rechargeable battery and the second rechargeable battery; and cause the one or more solid state relays to form the parallel connection between the first rechargeable battery and the second rechargeable battery during charging of the first rechargeable battery and the second rechargeable battery.

7. The mobile device of claim 5, wherein the at least one processor is configured to access the at least one memory and execute the computer-executable instructions to:

determine a first voltage of the first rechargeable battery;

receive a first user request to run a first application on the mobile device;

determine that the at least one processor requires a first required voltage to run the first application;

determine that the first voltage is less than the first required voltage;

cause the one or more solid state relays to form the series connection between the first rechargeable battery and the second rechargeable battery; and cause the first rechargeable battery and the second rechargeable battery to power the at least one processor while the first rechargeable battery and the second rechargeable battery are connected in series.

8. The mobile device of claim 5, wherein the at least one processor is configured to access the at least one memory and execute the computer-executable instructions to:

determine that the mobile device is connected to an external power source;

cause the one or more solid state relays to form the parallel connection between the first rechargeable battery and the second rechargeable battery; and cause the first rechargeable battery and the second rechargeable battery to be charged by the external power source while the first rechargeable battery and the second rechargeable battery are connected in parallel.

9. The mobile device of claim 5, wherein the one or more solid state relays comprises one or more MOSFETs.

10. The mobile device of claim 5, wherein the one or more solid state relays comprises one or more enhancement-mode MOSFETs.

11. The mobile device of claim 5, wherein the first rechargeable battery has a first voltage and a first capacity, wherein the second rechargeable battery has a second voltage and a second capacity, wherein the first voltage is equal to the second voltage, and wherein the first capacity is equal to the second capacity.

12. The mobile device of claim 5, further comprising a housing, wherein the first rechargeable battery and the second rechargeable battery are enclosed within the housing.

13. The mobile device of claim 12, wherein the at least one memory, the at least one processor, and the one or more solid state relays are enclosed within the housing.

14. The mobile device of claim 12, further comprising a heat sink enclosed within the housing and positioned adjacent to the at least one processor, wherein the heat sink is configured to dissipate heat generated by the at least one processor.

15. A method comprising:
   determining, by at least one processor coupled to at least one memory of a mobile device, a first voltage of a first rechargeable battery of the mobile device, the first rechargeable battery configured to power the at least one processor;
   determining that the first voltage is less than a first required voltage of the at least one processor;
   causing one or more solid state relays to form a series connection between the first rechargeable battery and a second rechargeable battery of the mobile device; and
   causing the first rechargeable battery and the second rechargeable battery to power the at least one processor while the first rechargeable battery and the second rechargeable battery are connected in series.

16. The method of claim 15, further comprising:
   receiving a first user request to run a first application on the mobile device; and
   determining that the at least one processor requires the first required voltage to run the first application.

17. The method of claim 15, further comprising:
   determining that the mobile device is connected to an external power source;
   causing the one or more solid state relays to form a parallel connection between the first rechargeable battery and the second rechargeable battery; and
   causing the first rechargeable battery and the second rechargeable battery to be charged by the external power source while the first rechargeable battery and the second rechargeable battery are connected in parallel.

18. The method of claim 15, further comprising:
   determining that the first voltage is greater than a second required voltage of the at least one processor;
   causing the one or more solid state relays to form a parallel connection between the first rechargeable battery and the second rechargeable battery; and
   causing the first rechargeable battery and the second rechargeable battery to power the at least one processor while the first rechargeable battery and the second rechargeable battery are connected in parallel.

19. The method of claim 18, further comprising:
   receiving a second user request to run a second application on the mobile device; and
   determining that the at least one processor requires the second required voltage to run the second application.

20. The method of claim 15, further comprising:
   determining that a peripheral device is connected to the mobile device;
   determining that the first voltage is less than a second required voltage of the peripheral device;
   causing the one or more solid state relays to form the series connection between the first rechargeable battery and the second rechargeable battery; and
   causing the first rechargeable battery and the second rechargeable battery to power the peripheral device while the first rechargeable battery and the second rechargeable battery are connected in series.

21. A system comprising:
   a mobile device comprising:
      at least one memory that stores computer-executable instructions;
      at least one processor configured to access the at least one memory and execute the computer-executable instructions;
      a first rechargeable battery configured to power the at least one processor;
      a second rechargeable battery configured to power the at least one processor; and
      one or more solid state relays electrically coupled to the first rechargeable battery and the second rechargeable battery, the one or more solid state relays configured to transition between a first state in which the one or more solid state relays form a series connection between the first rechargeable battery and the second rechargeable battery and a second state in which the one or more solid state relays form a parallel connection between the first rechargeable battery and the second rechargeable battery; and
   a peripheral device removably connectable to the mobile device;
   wherein the at least one processor is configured to access the at least one memory and execute the computer-executable instructions to:
      determine that the peripheral device is connected to the mobile device;
      determine a first voltage of the first rechargeable battery;
      determine that the first voltage is less than a first required voltage of the peripheral device;
      cause the one or more solid state relays to form the series connection between the first rechargeable battery and the second rechargeable battery; and
      cause the first rechargeable battery and the second rechargeable battery to power the peripheral device while the first rechargeable battery and the second rechargeable battery are connected in series.

22. The system of claim 21, wherein the peripheral device comprises a voltmeter.

23. The system of claim 21, wherein the peripheral device comprises a taser.

24. The system of claim 21, wherein the peripheral device comprises a DSLR flash.

25. The system of claim 21, further comprising a charging device removably connectable to the mobile device, the charging device comprising:
   at least one second memory that stores computer-executable instructions;
   at least one second processor configured to access the at least one memory and execute the computer-executable instructions to:
      determine that the charging device is connected to the mobile device and an external power source;
      determine the first voltage of the first rechargeable battery;
      determine that the at least one processor has received a user request to run an application on the mobile device;
      determine that the at least one processor requires a second required voltage to run the application;
      determine that the first voltage is less than the second required voltage;
      cause the one or more solid state relays to form the parallel connection between the first rechargeable battery and the second rechargeable battery;
      cause the first rechargeable battery and the second rechargeable battery to be charged by the external power source while the first rechargeable battery and the second rechargeable battery are connected in parallel; and
      cause the external power source to power the at least one processor while the first rechargeable battery and the second rechargeable battery are connected in parallel.

26. The system of claim 21, further comprising a charging device removably connectable to the mobile device, the charging device comprising:
- at least one second memory that stores computer-executable instructions;
- at least one second processor configured to access the at least one memory and execute the computer-executable instructions to:
  - determine that the charging device is connected to the mobile device and an external power source;
  - determine the first voltage of the first rechargeable battery;
  - determine that the at least one processor has received a user request to run an application on the mobile device;
  - determine that the at least one processor requires a second required voltage to run the application;
  - determine that the first voltage is less than the second required voltage;
  - cause the one or more solid state relays to form the series connection between the first rechargeable battery and the second rechargeable battery;
  - cause the first rechargeable battery and the second rechargeable battery to be charged by the external power source while the first rechargeable battery and the second rechargeable battery are connected in series; and
  - cause the first rechargeable battery, the second rechargeable battery, and the external power source to power the at least one processor while the first rechargeable battery and the second rechargeable battery are connected in series.

* * * * *